(12) United States Patent
Yoshida et al.

(10) Patent No.: US 7,470,059 B2
(45) Date of Patent: Dec. 30, 2008

(54) FAULT DIAGNOSTIC APPARATUS

(75) Inventors: Hideo Yoshida, Kobe (JP); Takayuki Satou, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 265 days.

(21) Appl. No.: 11/363,183

(22) Filed: Feb. 28, 2006

(65) Prior Publication Data

US 2006/0217857 A1    Sep. 28, 2006

(30) Foreign Application Priority Data

Mar. 1, 2005    (JP)    ............................. 2005-055618

(51) Int. Cl.
   *G01K 3/08*    (2006.01)
   *G01K 13/02*    (2006.01)

(52) U.S. Cl. ...................... 374/102; 374/109; 374/145; 701/34

(58) Field of Classification Search ................. 701/31, 701/34; 374/138, 144–45, 1–2, 101, 102, 374/107, 109, 112, 121, 133, 145, 146, 166; 165/41–44; 376/361–408; 73/114.68
See application file for complete search history.

(56) References Cited

U.S. PATENT DOCUMENTS

| | | | | |
|---|---|---|---|---|
| 4,817,418 A | * | 4/1989 | Asami et al. ............... | 73/118.1 |
| 6,393,357 B1 | * | 5/2002 | Holmes et al. .............. | 701/115 |
| 6,463,892 B1 | * | 10/2002 | Russell ..................... | 123/41.15 |
| 6,732,025 B2 | * | 5/2004 | Reese et al. .................. | 701/29 |
| 7,309,536 B2 | * | 12/2007 | Gabriel et al. ................ | 429/13 |
| 2002/0087237 A1 | * | 7/2002 | Ol et al. ........................ | 701/31 |
| 2003/0009276 A1 | * | 1/2003 | Isobe et al. .................. | 701/114 |
| 2004/0013165 A1 | * | 1/2004 | Plote et al. ................... | 374/172 |
| 2004/0184507 A1 | * | 9/2004 | Tsukamoto et al. ........... | 374/57 |
| 2005/0077368 A1 | * | 4/2005 | Zak et al. ...................... | 237/19 |
| 2005/0178130 A1 | * | 8/2005 | Van Gilder et al. ............ | 62/129 |
| 2006/0021361 A1 | * | 2/2006 | Gerum et al. ................. | 62/127 |
| 2006/0026971 A1 | * | 2/2006 | Sharpe ........................ | 62/126 |
| 2007/0047616 A1 | * | 3/2007 | Izumiura et al. ............ | 374/144 |

FOREIGN PATENT DOCUMENTS

EP    1273781 A2  *  1/2003
JP    63-145137    6/1988

* cited by examiner

*Primary Examiner*—Edward Lefkowitz
*Assistant Examiner*—Bret Adams
(74) *Attorney, Agent, or Firm*—Wenderoth, Lind & Ponack, L.L.P.

(57) ABSTRACT

A fault diagnostic apparatus is provided that enables improving estimate accuracy of the temperature of an object to be examined and to improve fault diagnosis accuracy of a temperature detector for detecting a temperature of the object to be examined. The fault diagnostic apparatus is for diagnosing a fault of a water temperature sensor for detecting a temperature of cooling water and includes a fault diagnostic device for diagnosing a fault of the water temperature sensor based on a change in temperature detected by the water temperature sensor in a situation where a parameter to be a chief source of heating the cooling water (such as an engine temperature) decreases.

11 Claims, 19 Drawing Sheets

Fig.2

| Water Temperature at Engine Stop WT1 | Outside Air Temperature | | Drop Water Temperature $dn_{ij}$ |
|---|---|---|---|
| | at Engine Stop OT1 | after Elapse of Time T OT2 | |
| 80°C~ | 40°C~ | 40°C~ | $d8_{11}$ |
| | | 30~39°C | $d8_{12}$ |
| | | 20~29°C | $d8_{13}$ |
| | | ~19°C | $d8_{14}$ |
| | 30~39°C | 40°C~ | $d8_{21}$ |
| | | 30~39°C | $d8_{22}$ |
| | | 20~29°C | $d8_{23}$ |
| | | 10~19°C | $d8_{24}$ |
| | | ~9°C | $d8_{25}$ |
| | ⋮ | ⋮ | ⋮ |
| 70~79°C | 40°C~ | 40°C~ | $d7_{11}$ |
| | | 30~39°C | $d7_{12}$ |
| | | 20~29°C | $d7_{13}$ |
| | | ~19°C | $d7_{14}$ |

| Water Temperature at Engine Stop WT1 | Outside Air Temperature | | Drop Water Temperature $dn_{ij}$ | Correction Value $Adn_{ij}$ |
|---|---|---|---|---|
| | at Engine Stop OT1 | after Elapse of Time T OT2 | | |
| 80°C～ | 40°C～ | 40°C～ | $d8_{11}$ | $Ad8_{11}$ |
| | | 30～39°C | $d8_{12}$ | $Ad8_{12}$ |
| | | 20～29°C | $d8_{13}$ | $Ad8_{13}$ |
| | | ～19°C | $d8_{14}$ | $Ad8_{14}$ |
| | 30～39°C | 40°C～ | $d8_{21}$ | $Ad8_{21}$ |
| | | 30～39°C | $d8_{22}$ | $Ad8_{22}$ |
| | | 20～29°C | $d8_{23}$ | $Ad8_{23}$ |
| | | 10～19°C | $d8_{24}$ | $Ad8_{24}$ |
| | | ～9°C | $d8_{25}$ | $Ad8_{25}$ |
| ⋮ | ⋮ | ⋮ | ⋮ | ⋮ |
| 70～79°C | 40°C～ | 40°C～ | $d7_{11}$ | $Ad7_{11}$ |
| | | 30～39°C | $d7_{12}$ | $Ad7_{12}$ |
| | | 20～29°C | $d7_{13}$ | $Ad7_{13}$ |
| | | ～19°C | $d7_{14}$ | $Ad7_{14}$ |

| Water Temperature at Engine Stop WT1 | Outside Air Temperature | | Drop Water Temperature $dn_{ij}$ |
|---|---|---|---|
| | at Engine Stop OT1 | after Elapse of Time T OT2 | |
| 80°C~ | 40°C~ | 40°C~ | $D8_{11}$ |
| | | 30~39°C | $D8_{12}$ |
| | | 20~29°C | $D8_{13}$ |
| | | ~19°C | $D8_{14}$ |
| | 30~39°C | 40°C~ | $D8_{21}$ |
| | | 30~39°C | $D8_{22}$ |
| | | 20~29°C | $D8_{23}$ |
| | | 10~19°C | $D8_{24}$ |
| | | ~9°C | $D8_{25}$ |
| ⋮ | ⋮ | ⋮ | ⋮ |
| 70~79°C | 40°C~ | 40°C~ | $D7_{11}$ |
| | | 30~39°C | $D7_{12}$ |
| | | 20~29°C | $D7_{13}$ |
| | | ~19°C | $D7_{14}$ |

Fig.18 [3-3]

FAULT DIAGNOSTIC APPARATUS

BACKGROUND OF THE INVENTION

1. Field of the Invention

The present invention relates to a fault diagnostic apparatus and, more particularly, to a fault diagnostic apparatus for diagnosing a fault of a temperature sensor such as a water temperature sensor.

2. Description of the Relevant Art

Water and oil are useful for cooling an engine. The temperature of water or oil is one item of data for judging a state of the engine. For example, under idle speed control, an air flow rate is determined depending on the water temperature, and a corrective factor for correcting a basic fuel injection amount for the sake of improving a warm-up characteristic and an accelerating ability and cleaning emission gas is determined depending on the water temperature.

When this water temperature sensor for detecting a water temperature has a fault, control of each kind is carried out based on an abnormal output signal, and therefore, there is a possibility that some problems may be caused. In order to solve this problem, techniques of several kinds for diagnosing a fault of a water temperature sensor have been proposed.

For example, Japanese Patent Application Laid-Open No. 11-82144 discloses an invention wherein a water temperature sensor is judged as being in an abnormal condition when a cooling water temperature detected after an engine was judged as being warmed up is lower than a predetermined water temperature. Japanese Patent Application Laid-Open No. 2004-76689 discloses an invention wherein by estimating a cooling water temperature based on a parameter related to a heating value of an engine (an amount of heat to be transferred from the engine to the cooling water) and a parameter related to a quantity of radiant heat of the cooling water, and by comparing the estimated cooling water temperature with a cooling water temperature detected by a water temperature sensor, whether a flow regulating valve for regulating a flow rate of the cooling water is abnormal or not is checked.

However, in both of the inventions described in the Patent Documents 1 and 2, a fault of the water temperature sensor or the flow regulating valve is diagnosed with the engine running (i.e. in a situation where the temperature of the engine to be a chief source of heating the cooling water is high). When the temperature of the engine is high, the heating value from the engine also becomes high, leading to a rise in cooling water temperature. As a result, since the cooling water temperature varies widely under a great influence of the heating value from the engine, there is a possibility that a very high degree of estimate accuracy of the cooling water temperature cannot be expected while the engine is running.

SUMMARY OF THE INVENTION

The present invention was accomplished in order to solve the above problem, and it is an object of the present invention to provide a fault diagnostic apparatus, whereby estimate accuracy of temperature of an object to be examined such as cooling water can be improved and fault diagnosis accuracy of a temperature detector for detecting a temperature of the object to be examined can be improved.

In order to achieve the above object, a fault diagnostic apparatus according to a first aspect of the present invention is characterized by a fault diagnostic apparatus for diagnosing a fault of a temperature detector for detecting a temperature of an object to be examined, comprising a fault diagnostic device for diagnosing a fault of the temperature detector based on a change in temperature detected by the temperature detector in a situation where a parameter of a chief source of heating the object to be examined decreases.

When the fault diagnostic apparatus according to the first aspect of the present invention is used, an abnormal condition of the temperature detector is checked in a situation where a parameter of a chief source of heating the object to be examined (e.g. a temperature of a heat source) decreases. In the situation where the parameter decreases, the temperature of the object to be examined also falls gradually with the decrease. Therefore, by monitoring a change in temperature of the object to be examined, a fault of the temperature detector can be diagnosed. Since the parameter never rises, it becomes easier to estimate a temperature change of the object to be examined. Thus, the fault diagnosis accuracy of the temperature detector can be improved.

A fault diagnostic apparatus according to a second aspect of the present invention is characterized by a fault diagnostic apparatus for diagnosing a fault of a temperature detector for detecting a temperature of an object to be examined, wherein the object to be examined is mounted on a vehicle, the fault diagnostic apparatus comprising a fault diagnostic device for diagnosing a fault of the temperature detector based on a change in temperature detected by the temperature detector in a situation where a temperature of an internal combustion engine to be a chief source of heating the object to be examined decreases, wherein a case of an ignition (IG) switch being in the off position is judged as being in a situation where the temperature of the internal combustion engine decreases.

When the fault diagnostic apparatus according to the second aspect of the present invention is used, the object to be examined is mounted on a vehicle. Therefore, it is possible to prevent a problem in movement control of the vehicle from being caused by an occurrence of a fault of the temperature detector.

Moreover, whether the temperature detector is in an abnormal condition or not is checked in a situation where a temperature of an internal combustion engine (e.g. an engine) to be a chief source of heating the object to be examined decreases (e.g. an IG switch is in the off position). In the situation where the temperature of the internal combustion engine decreases, the temperature of the object to be examined also falls gradually with the decrease. As a result, it can be made easier to estimate a temperature change of the object to be examined.

Furthermore, when the fault diagnostic apparatus according to the second aspect of the present invention is used, a case where an IG switch is in the off position is judged as being in a situation where the temperature of the internal combustion engine decreases. As a result, whether or not to be is in a situation where the temperature of the internal combustion engine decreases can be appropriately judged.

A fault diagnostic apparatus according to a third aspect of the present invention is characterized by the fault diagnostic device, comprising a temperature estimating unit for estimating a temperature of the object to be examined based on parameters related to a quantity of radiant heat of the object to be examined and/or a heating value to the object to be examined, and a temperature comparing unit for comparing an estimated temperature estimated by the temperature estimating unit with a temperature detected by the temperature detector, wherein the fault diagnostic device diagnoses a fault of the temperature detector based on a comparison result by the temperature comparing unit in the fault diagnostic apparatus according to the second aspect of the present invention.

A temperature change of the object to be examined is determined depending on a quantity of radiant heat of the object to be examined and a heating value to the object to be examined. In other words, the temperature change of the object to be examined can be properly estimated by giving consideration to the quantity of radiant heat of the object to be examined and the heating value to the object to be examined.

When the fault diagnostic apparatus according to the third aspect of the present invention is used, a temperature of the object to be examined is estimated based on parameters related to a quantity of radiant heat of the object to be examined and/or a heating value to the object to be examined. An estimated temperature estimated in this way and a temperature detected by the temperature detector are compared with each other, and a fault of the temperature detector is checked based on this comparison result. As a result, since a fault of the temperature detector is diagnosed by comparing an estimated temperature properly estimated with a temperature detected by the temperature detector, the accuracy of the diagnosis can be improved.

A fault diagnostic apparatus according to a fourth aspect of the present invention is characterized by the temperature comparing unit which compares an estimated temperature at the end of a predetermined time period after the IG switch is turned off with a measured temperature detected by the temperature detector in the fault diagnostic apparatus according to the third aspect of the present invention.

When the fault diagnostic apparatus according to the fourth aspect of the present invention is used, an estimated temperature at the end of a predetermined time period after the IG switch is turned off (e.g. after an elapse of 180 minutes from a stop of the engine) and a measured temperature at that time are compared with each other. Thus, for example, by comparing an estimated temperature with a measured temperature after the engine to be a chief source of heating the object to be examined (cooling water for cooling the engine) is sufficiently cooled, a fault of the temperature detector (water temperature sensor) for detecting a temperature of the object to be examined can be diagnosed.

Concerning a temperature of the object to be examined, it appears that the detection accuracy thereof is enhanced better when the engine is in a low-temperature condition than in a high-temperature condition. Therefore, by comparing an estimated temperature with a measured temperature at the end of the predetermined time period after the IG switch is turned off, the accuracy of the fault diagnosis can be improved.

A fault diagnostic apparatus according to a fifth aspect of the present invention is characterized by the temperature estimating unit which estimates a temperature of the object to be examined after an elapse of a predetermined time period from a prescribed time based on a map showing relationships among a temperature of the object to be examined at the prescribed time, a parameter at the prescribed time, a parameter after an elapse of the predetermined time period from the prescribed time and a temperature of the object to be examined that drops in the predetermined time period after the prescribed time in the fault diagnostic apparatus according to the third or fourth aspect of the present invention.

When the fault diagnostic apparatus according to the fifth aspect of the present invention is used, by detecting a temperature of the object to be examined at the prescribed time, a parameter at the prescribed time and a parameter after an elapse of a predetermined time period from the prescribed time, a temperature of the object to be examined after an elapse of the predetermined time period form the prescribed time can be properly estimated.

For example, when the below-mentioned pieces of information a-c are detected, a temperature of cooling water after an elapse of 180 minutes from a stop of the engine can be estimated.

a. A temperature of the cooling water at the stop of the engine b. An outside air temperature at the stop of the engine c. An outside air temperature after an elapse of 180 minutes from the stop of the engine A fault diagnostic apparatus according to a sixth aspect of the present invention is characterized by the temperature estimating unit which estimates a temperature of the object to be examined after an elapse of a predetermined time period based on a temperature of the object to be examined detected by the temperature detector at a prescribed time and, a parameter at the prescribed time or a parameter after an elapse of the predetermined time period from the prescribed time, or a parameter at the prescribed time and a parameter after an elapse of the predetermined time period from the prescribed time in the fault diagnostic apparatus according to the third or fourth aspect of the present invention.

In the case of estimating a temperature change of the object to be examined in an elapse of time a after time A, the below-mentioned pieces of information a-c make the estimate accuracy higher.

a. A temperature of the object to be examined at the time A b. An environment (e.g. an outside air temperature) at the time A c. An environment (e.g. an outside air temperature) after an elapse of the time a after the time A However, if the time a is not so long, the environment of c may be substituted with the environment of b, or vice versa. For example, it may be adoptable to think that the outside air temperature does not change in an elapse of the time a after the time A.

The environment of c may be estimated from the environment of b, or vice versa. For example, when the outside air temperature at the time A is 20° C., the outside air temperature after an elapse of the time a may be increased by a few degrees (e.g. 2° C.) to 22° C. or be decreased by a few degrees (e.g. 2° C.) to 18° C. Conversely, when the outside air temperature after an elapse of the time a from the time A is 20° C., the outside air temperature before an elapse of the time a (at the time A) may be decreased by a few degrees (e.g. 2° C.) to 18° C. or be increased by a few degrees (e.g. 2° C.) to 22° C. Here, whether to increase or decrease the temperature, and how many degrees the temperature is increased or decreased may be controlled depending on time zones and the like.

When the fault diagnostic apparatus according to the sixth aspect of the present invention is used, a temperature of the object to be examined after an elapse of a predetermined time period is estimated based on a temperature of the object to be examined detected by the temperature detector at the prescribed time, a parameter at the prescribed time and/or a parameter after an elapse of the predetermined time period from the prescribed time. As a result, the temperature of the object to be examined after an elapse of the predetermined time period can be estimated with good accuracy.

A fault diagnostic apparatus according to a seventh aspect of the present invention is characterized by further comprising a correcting unit for correcting an estimated temperature to be estimated by the temperature estimating unit in a manner that makes the estimated temperature closer to a measured temperature to be detected by the temperature detector and a learning unit that learns a correction value by the correcting unit based on a deviation between an estimated temperature of the object to be examined estimated by the temperature estimating unit and a measured temperature detected by the temperature detector in a case where the temperature detector was judged as being normal in any one of the fault diagnostic apparatuses according to the third to sixth aspects of the present invention.

When a large difference is caused between an estimated temperature to be estimated by the temperature estimating unit and a measured temperature, it is judged that there is a fault in the temperature detector. Therefore, in the case of low estimate accuracy, there is a possibility that it may be judged that there is a fault in the temperature detector, regardless of no fault, or conversely, there is a possibility that it may be judged that there is no fault in the temperature detector, regardless of an occurrence of a fault.

When the fault diagnostic apparatus according to the seventh aspect of the present invention is used, an estimated temperature to be estimated by the temperature estimating unit is corrected in a manner that makes the estimated temperature closer to a measured temperature to be detected by the temperature detector, and the correction value is learned based on a deviation between the estimated temperature and the measured temperature in a case where the temperature detector was judged as being normal. Thus, the accuracy of the estimated temperature of the object to be examined can be improved and the accuracy of the diagnosis can be improved.

A fault diagnostic apparatus according to an eighth aspect of the present invention is characterized by the parameter which is at least one of an outside air temperature and an internal combustion engine oil temperature in any one of the fault diagnostic apparatuses according to the third to seventh aspects of the present invention.

When the fault diagnostic apparatus according to the eighth aspect of the present invention is used, at least one of an outside air temperature and an oil temperature of an internal combustion engine (such as an engine oil temperature) is used as the parameter. In a situation where the temperature of the internal combustion engine falls, the outside air temperature or the engine oil temperature greatly influences heat radiation of the object to be examined (such as cooling water). For example, when the cooling water is 60° C., its temperature drop rate in the case of an outside air temperature of −10° C. is overwhelmingly higher than that in the case of an outside air temperature of 30° C.

Since the outside air temperature and the internal combustion engine oil temperature which greatly influence heat radiation of the object to be examined are used as the parameters, the estimated temperature of the object to be examined can be more properly determined.

A fault diagnostic apparatus according to a ninth aspect of the present invention is characterized by an estimated temperature which is corrected based on a parameter related to a temperature drop of the object to be examined in any one of the fault diagnostic apparatuses according to the third to eighth aspects of the present invention.

A fault diagnostic apparatus according to a tenth aspect of the present invention is characterized by the parameter which is at least one of an atmospheric pressure and location information of the vehicle in the fault diagnostic apparatus according to the ninth aspect of the present invention.

Even under the same condition of outside air temperature, it is considered that a difference is caused in temperature drop of the object to be examined by a difference in an environment other than the outside air temperature. For example, the rate of drop in temperature of cooling water is different between at a sea level altitude of 0 m and above 1000 m, even if the outside air temperature is 4° C. at the both places.

When the fault diagnostic apparatus according to the ninth or tenth aspect of the present invention is used, the estimated temperature is corrected based on a parameter related to a temperature drop of the object to be examined, leading to further improvement of the accuracy of the estimated temperature.

Here, as the parameter, an atmospheric pressure and location information of the vehicle are exemplified. From the location information of the vehicle, an altitude where the vehicle is located can be recognized, or it can be recognized that the vehicle is in an urban area (where the rate of temperature drop of cooling water becomes lower) or that the vehicle is in a mountainous region where cool wind blows (where the rate of temperature drop of cooling water becomes higher).

A fault diagnostic apparatus according to an eleventh aspect of the present invention is characterized by the fault diagnostic device, comprising a temperature estimating unit for estimating a temperature of the object to be examined based on location information of the vehicle and a temperature drop characteristic of the object to be examined in a specified place, and a temperature comparing unit for comparing an estimated temperature estimated by the temperature estimating unit with a temperature detected by the temperature detector, the fault diagnostic device which diagnoses a fault of the temperature detector based on a comparison result by the temperature comparing unit in the fault diagnostic apparatus according to the second aspect of the present invention.

A fault diagnostic apparatus according to a twelfth aspect of the present invention is characterized by the specified place which is a parking lot where the vehicle is frequently parked in the fault diagnostic apparatus according to the eleventh aspect of the present invention.

It is thought that in a specified place, there is a temperature drop characteristic of the object to be examined in accordance with the place. By making use of this characteristic, the estimate accuracy of temperature can be improved.

When the fault diagnostic apparatus according to the eleventh or twelfth aspect of the present invention is used, the temperature of the object to be examined is estimated based on the temperature drop characteristic of the object to be examined in the specified place, the estimated temperature estimated by the temperature estimating unit and a temperature detected by the temperature detector are compared with each other, and based on this comparison result, a fault of the temperature detector is diagnosed.

Therefore, when the vehicle is parked in the specified place, the estimated temperature of the object to be examined is determined with good accuracy, based on the temperature drop characteristic of the object to be examined in the specified place. Thus, the accuracy of the fault diagnosis of the temperature detector can also be improved. Here, as the specified place, a parking lot where the vehicle is frequently parked (such as a garage of a user's house, a parking lot of the user's office and a parking pool of a supermarket which the user often visits) is exemplified.

BRIEF DESCRIPTION OF THE DRAWINGS

FIG. 2 is a map of a memory format of a database;

FIG. 7 is an example of a memory format of the database;

FIG. 15 is an example of a memory format of a database;

DESCRIPTION OF THE PREFERRED EMBODIMENTS

The preferred embodiments of the fault diagnostic apparatus according to the present invention are described below by reference to the Figures noted above.

Figure 1:
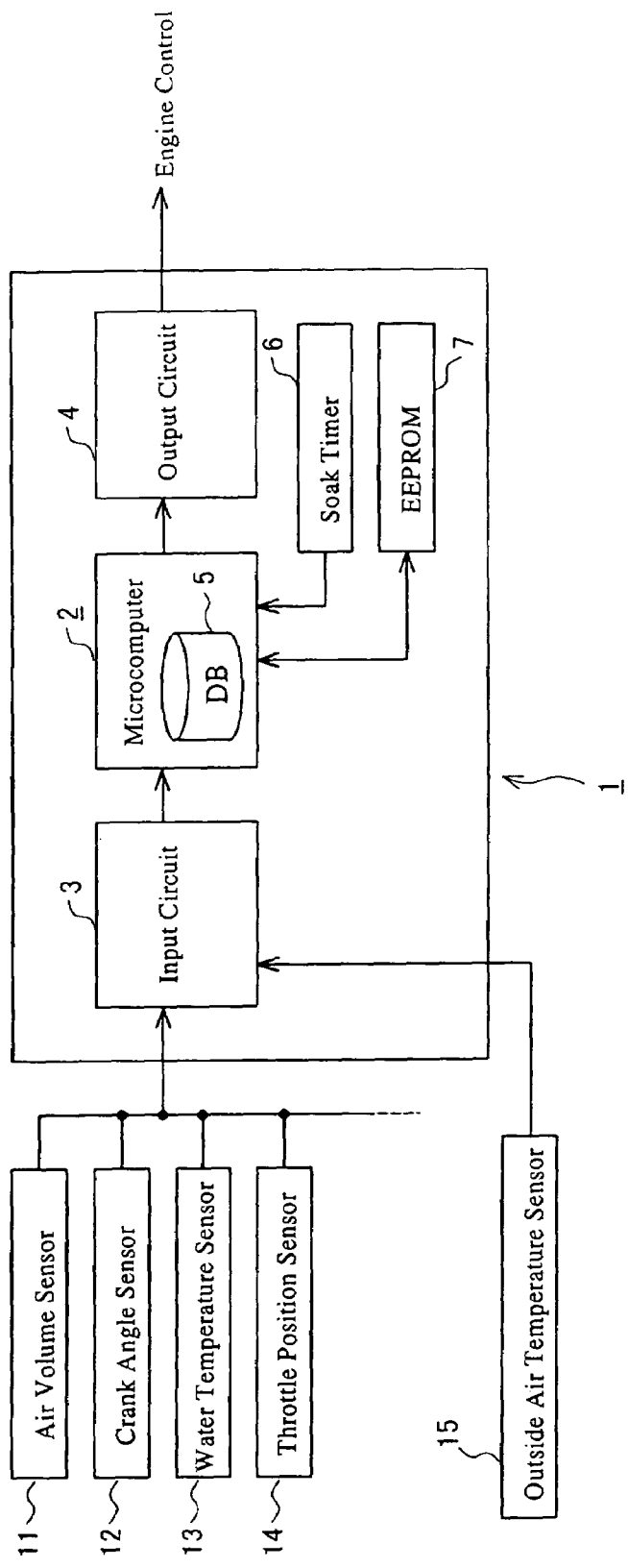
FIG. 1 is a block diagram schematically showing the principal part of an engine control unit wherein a fault diagnostic apparatus according to a first embodiment of the present invention is adopted.

FIG. 1 is a block diagram schematically showing the principal part of an engine control unit wherein a fault diagnostic apparatus according to a first embodiment is adopted.

Reference numeral 1 in FIG. 1 represents an engine control unit, comprising a microcomputer 2 having a CPU, a ROM and a RAM which are not shown and a database 5, an input circuit 3, an output circuit 4, a soak timer 6 for realizing a power supply to the engine control unit 1 at the end of an elapse of a predetermined time T (e.g. 180 minutes) after an IG switch is turned off (i.e. an electric power supply to the engine control unit 1 is shut off), and an EEPROM 7. Here, the database 5 may be arranged not within the microcomputer 2 but outside the microcomputer 2, though the rate of processing data becomes lower.

The microcomputer 2 captures information through the input circuit 3 from sensors of each kind (e.g. an air volume sensor 11, a crank angle sensor 12, a water temperature sensor 13 for detecting a temperature of cooling water for cooling an engine, and a throttle position sensor 14) and the like, performs computing processing of each kind, and conducts engine control and the like through the output circuit 4. In addition, an outside air temperature sensor 15 is connected through the input circuit 3 to the microcomputer 2, which can grasp an outside air temperature.

FIG. 2 is a map showing relationships among a water temperature at a stop of the engine, an outside air temperature at the stop of the engine, an outside air temperature after an elapse of the predetermined time T from the stop of the engine and a water temperature that drops in an elapse of the predetermined time T after the stop of the engine. This is turned into data form and the data is stored in the database 5.

The map shown in FIG. 2 indicates that a water temperature that drops in an elapse of the predetermined time T after a stop of the engine is '$d8_{23}$', where a water temperature at the stop of the engine is 80° C. or above, an outside air temperature at that time is between 30° C. and 39° C. and an outside air temperature after an elapse of the predetermined time T from the stop of the engine is between 20° C. and 29° C. For example, in a case where the water temperature at the stop of the engine is 82° C., the outside air temperature at that time is 33° C., the outside air temperature after an elapse of the predetermined time T from the stop of the engine is 28° C. and the drop water temperature $d8_{23}$ is set to be '20° C.', the water temperature after an elapse of the predetermined time T from the stop of the engine can be estimated as being 62°C. (=82°C.−20°C.) from the map shown in FIG. 2.

Figure 3:
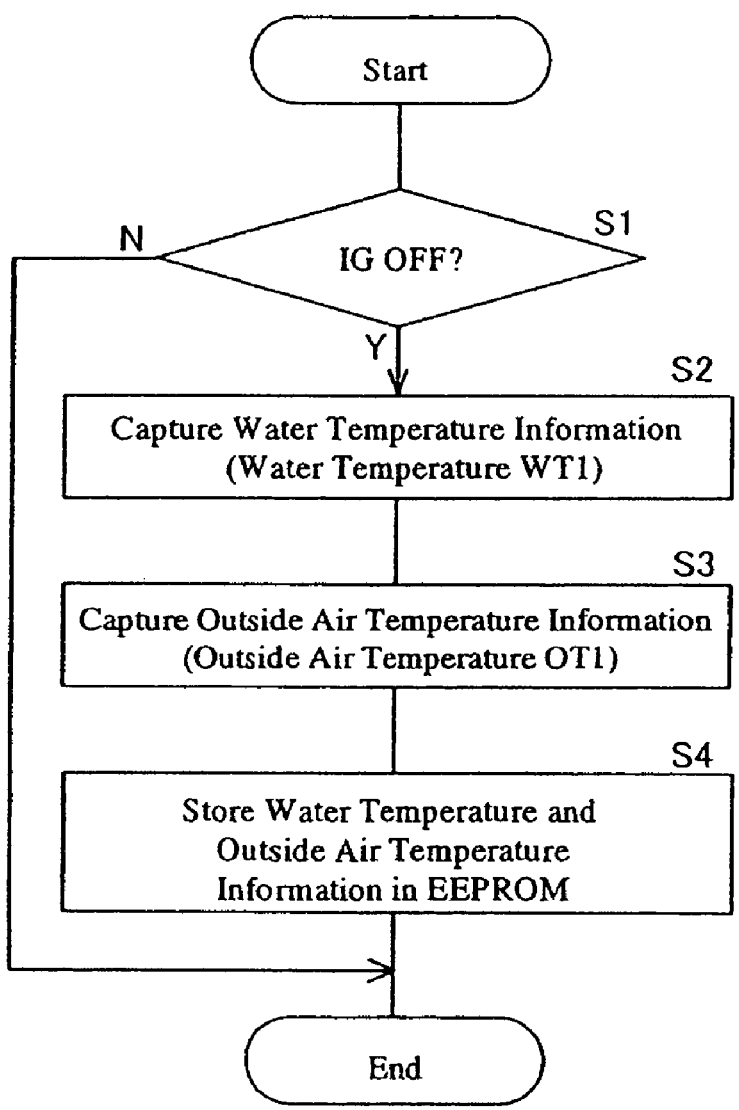
FIG. 3 is a flowchart showing a processing operation performed by a microcomputer in the engine control unit wherein the fault diagnostic apparatus according to the first embodiment is adopted.

A processing operation [1-1] performed by the microcomputer 2 in the engine control unit 1 wherein the fault diagnostic apparatus according to the first embodiment is adopted is described below with a flowchart shown in FIG. 3. Here, the processing operation [1-1] is conducted every prescribed time period. First, whether the ignition (IG) switch was turned from the on position to the off position or not is judged (Step S1). When it is judged that the IG switch was turned from the on position to the off position (i.e. the engine came to a stop), information about a temperature of cooling water (water temperature WT1) obtained from the water temperature sensor 13 is captured (Step S2), information about a temperature of outside air (outside air temperature OT1) obtained from the outside air temperature sensor 15 is captured (Step S3), and these pieces of temperature information are stored in the EEPROM 7 (Step S4).

Figure 4:
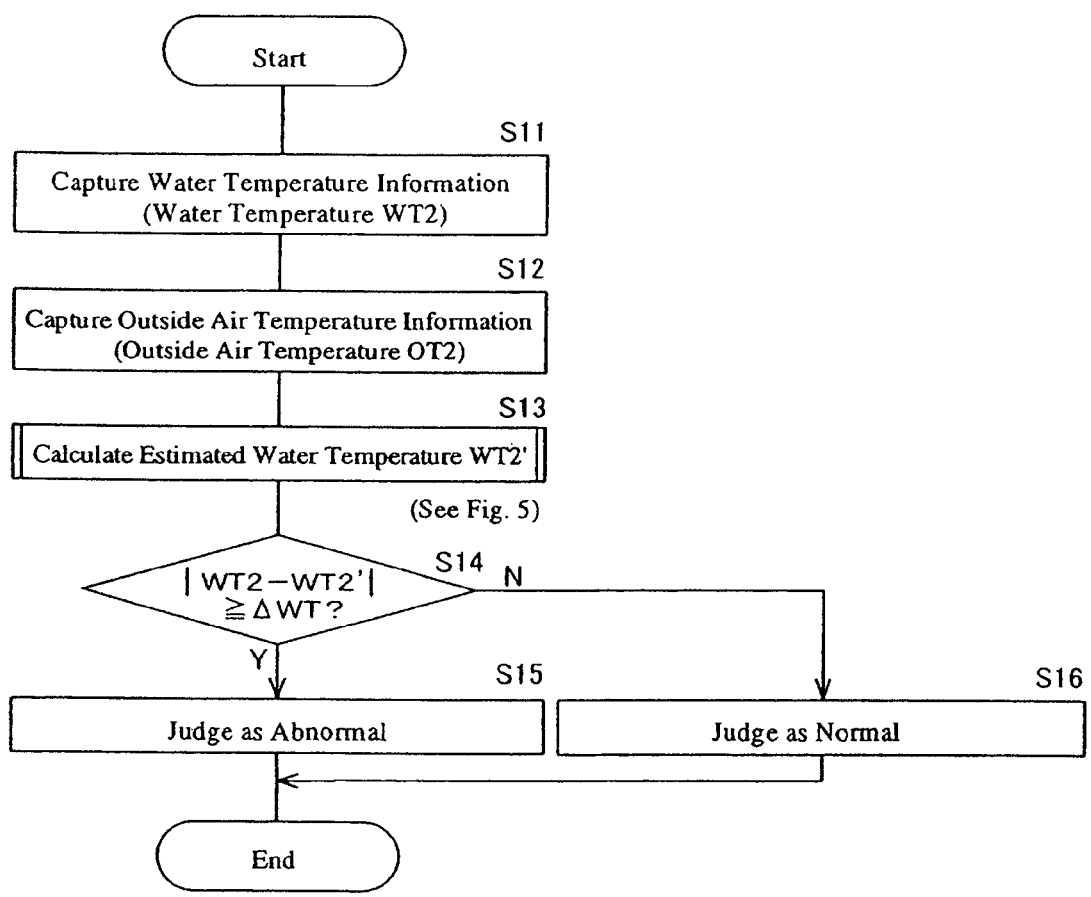
FIG. 4 is a flowchart showing a processing operation performed by the microcomputer in the engine control unit wherein the fault diagnostic apparatus according to the first embodiment is adopted.

A processing operation [1-2] performed by the microcomputer 2 in the engine control unit 1 wherein the fault diagnostic apparatus according to the first embodiment is adopted is described below with a flowchart shown in FIG. 4. Here, the processing operation [1-2] is conducted when electric power was provided by the soak timer 6 (i.e. when the predetermined time T elapsed after the stop of the engine). In other words, the processing operation [1-2] is conducted in cases where the engine has been at a stop for the predetermined time T.

Information about a temperature of cooling water (water temperature WT2) obtained from the water temperature sensor 13 is captured (Step S11), information about a temperature of outside air (outside air temperature OT2) obtained from the outside air temperature sensor 15 is captured (Step S12), and a water temperature WT2' of the cooling water after an elapse of the predetermined time T from the stop of the engine is estimated (Step S13). A method of estimating the water temperature WT2' is described in detail below with a flowchart shown in FIG. 5.

After estimating the water temperature WT2', whether or not a difference between the water temperature WT2 detected by the water temperature sensor 13 and the estimated water temperature WT2' is not less than a prescribed value Δ WT is judged (Step S14). When it is judged that the difference between the water temperature WT2 and the estimated water temperature WT2' is not less than the prescribed value Δ WT (i.e. the water temperature WT2 detected by the water temperature sensor 13 is far different from the estimated water temperature WT2'), it is decided that there is a fault in the water temperature sensor 13 (Step S15). On the other hand, when it is judged that the difference between the water temperature WT2 and the estimated water temperature WT2' is less than the prescribed value Δ WT, it is decided that the water temperature sensor 13 is in a normal condition (Step S16).

Figure 5:
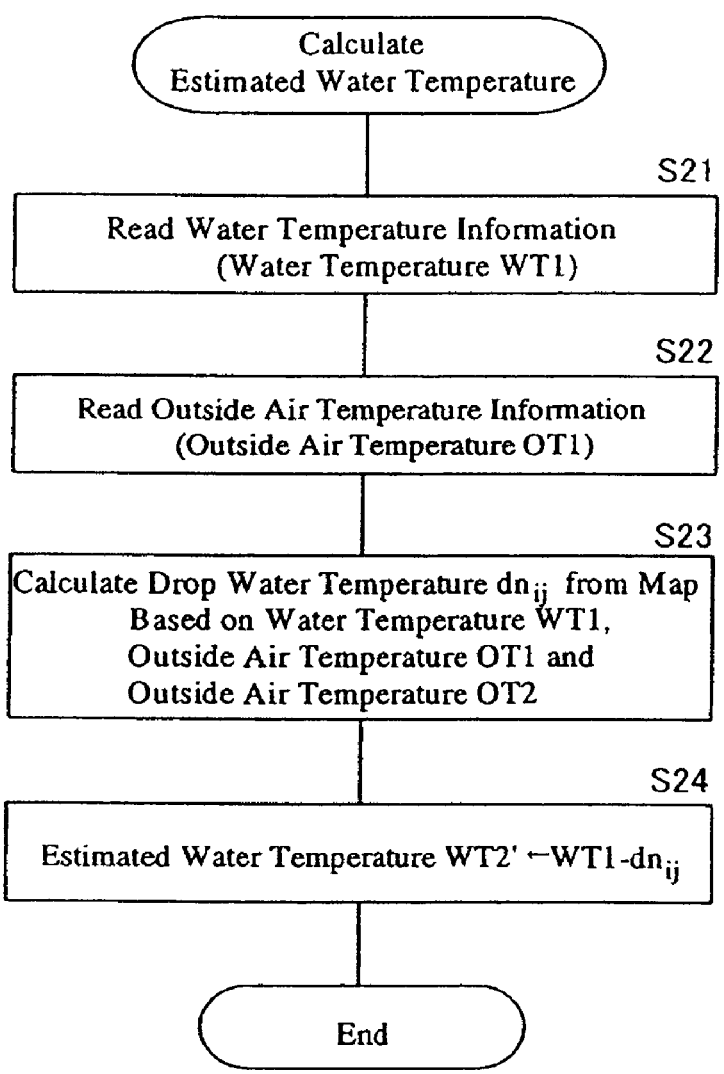
FIG. 5 is a flowchart showing a processing operation performed by the microcomputer in the engine control unit wherein the fault diagnostic apparatus according to the first embodiment is adopted.

A processing operation [1-3] performed by the microcomputer 2 in the engine control unit 1 wherein the fault diagnostic apparatus according to the first embodiment is adopted is described below with a flowchart shown in FIG. 5. Here, the processing operation [1-3] is conducted in Step S13 "Calculate Estimated Water Temperature WT2'" shown in FIG. 4.

Information showing the water temperature WT1 and the outside air temperature OT1 at the stop of the engine is read from the EEPROM 7 (Steps S21 and S22). And based on the water temperature WT1 at the stop of the engine, the outside air temperature OT1 at the stop of the engine and the outside air temperature OT2 after an elapse of the predetermined time T from the stop of the engine, a water temperature $dn_{ij}$ (e.g. $d8_{11}$) that drops in an elapse of the predetermined time T after the stop of the engine is obtained from the map information (see FIG. 2) stored in the database 5 (Step S23). Thereafter, by subtracting the drop water temperature $dn_{ij}$ from the water temperature WT1, the estimated water temperature WT2' is calculated (Step S24).

Here, the outside air temperature is adopted as a parameter related to a quantity of radiant heat of the cooling water (however, when the outside air temperature is higher than the temperature of the cooling water, the outside air temperature becomes a parameter related to a heating value to the cooling water), and the temperature of the cooling water is estimated. But the parameter related to the quantity of radiant heat of the cooling water or the heating value to the cooling water is not limited to the outside air temperature. In another embodiment, for example, as a parameter related to a quantity of radiant heat of cooling water or a heating value to the cooling water, an engine oil temperature may be adopted. It is needless to say that a plurality of parameters may be adopted.

Figure 6:
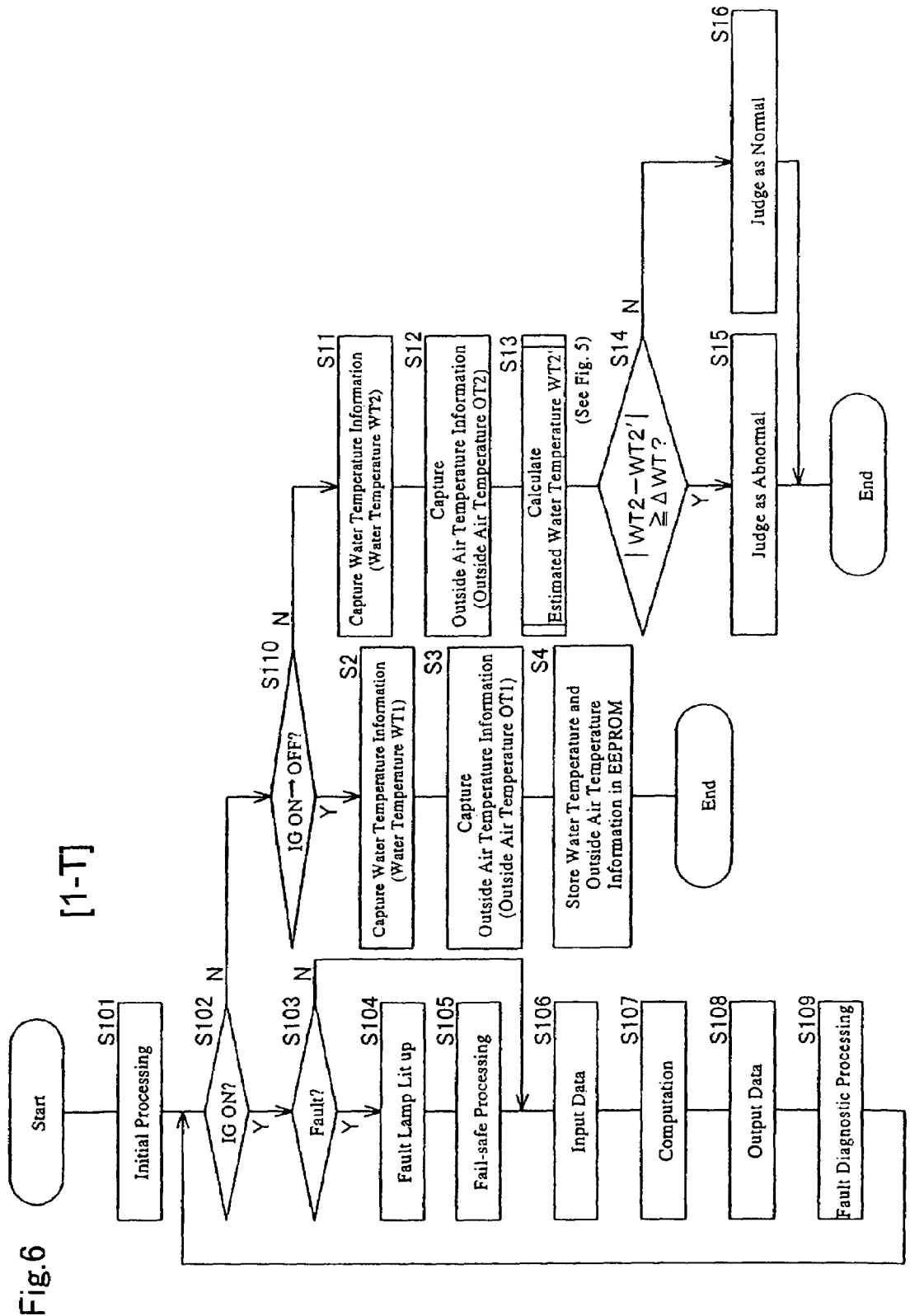
FIG. 6 is a flowchart showing a processing operation performed by the microcomputer in the engine control unit wherein the fault diagnostic apparatus according to the first embodiment is adopted.

The processing operations [1-1] to [1-3] which are characteristics of the apparatus according to the present invention, performed by the microcomputer 2 in the engine control unit 1 wherein the fault diagnostic apparatus according to the first embodiment is adopted were separately described above. An overall processing operation [1-T] performed by the microcomputer 2 is described below with a flowchart shown in FIG. 6. Here, the processing operation [1-T] is performed when the microcomputer 2 started.

First, initial processing of the microcomputer 2 is conducted (Step S101). Then, whether the IG switch is in the on position or not is judged (Step S102). Here, as the initial processing, processing for transferring data in a stand-by RAM to a normal RAM is exemplified.

When it is judged that the IG switch is in the on position (i.e. the microcomputer 2 was caused to start by an IG key operation), whether there is a fault in the sensors (such as the water temperature sensor 13), an actuator and a wire harness of an engine control system or not is judged (Step S103). In other words, whether or not it was decided that there was a fault through the below-described fault diagnostic processing in Step S109, or whether or not it was decided that there was a fault in the water temperature sensor 13 in Step S15 is judged.

When it is judged that there is a fault in the sensor or the like, a fault warning lamp is lit up (Step S104), fail-safe processing is performed (Step S105), and then, the operation goes to Step S106. As the fail-safe processing, processing for setting abnormal data to be a fixed value is exemplified. For example, when there is a fault in the water temperature sensor 13, water temperature data is fixed at 80° C.

On the other hand, when it is judged that there is no fault in the sensor or the like in Step S103, the operation directly goes to Step S106 since the processing in Steps S104 and S105 is not required.

Data of each kind is input (Step S106), computing processing is performed (Step S107), engine control is conducted by outputting data obtained through the computation (Step S108), fault diagnostic processing is performed on the sensors and the like of the engine control system (Step S109), and then, the operation returns to Step S102. As the engine control, fuel injection control, ignition timing control, knock control and idle speed control are exemplified.

When it is judged that the IG switch is not in the on position in Step S102, whether the IG switch was turned from the on position to the off position or not is judged (Step S110). When it is judged that the IG switch was turned from the on position to the off position (i.e. the engine came to a stop), the processing operation [1-1] (Steps S1-S4) shown in FIG. 3 is conducted.

On the other hand, when it is judged that the IG switch was not turned from the on position to the off position (i.e. the IG switch has been in the off position), this starting of the microcomputer 2 is a start caused by the soak timer 6 while the engine is at a stop. Then, the processing operation [1-2] (Steps S11-S16) shown in FIG. 4 is conducted.

By using the fault diagnostic apparatus according to the first embodiment, in a situation where the engine temperature to be a chief source of heating the cooling water decreases, a fault of the water temperature sensor 13 is diagnosed. In the situation where the engine temperature decreases, the temperature of the cooling water also falls gradually with the decrease. Therefore, by monitoring a change in temperature of the cooling water, a fault of the water temperature sensor 13 can be diagnosed. Moreover, since the engine temperature does not rise, it becomes easier to estimate a change in temperature of the cooling water. Thus, the accuracy of the fault diagnosis of the water temperature sensor 13 can be improved.

As described above, when a difference of the prescribed value Δ WT or above is caused between the estimated water temperature WT2' after an elapse of the predetermined time T from the stop of the engine and the measured water temperature WT2 detected by the water temperature sensor 13, it is judged that there is a fault in the water temperature sensor 13. Therefore, in the case of low estimate accuracy, there is a possibility that it may be judged that there is a fault in the water temperature sensor 13, regardless of no fault, or conversely, there is a possibility that it may be judged that there is no fault in the water temperature sensor 13, regardless of an occurrence of a fault.

In another embodiment, by using a map showing relationships among a water temperature WT1 at a stop of the engine, an outside air temperature OT1 at the stop of the engine, an outside air temperature OT2 after an elapse of a predetermined time T from the stop of the engine, a water temperature $dn_{ij}$ that drops in an elapse of the predetermined time T after the stop of the engine and a correction value $Adn_{ij}$ for correcting the drop water temperature $dn_{ij}$ as shown in FIG. 7, the drop water temperature $dn_{ij}$ may be corrected and the estimated water temperature WT2' (=WT1-$dn_{ij}$+$Adn_{ij}$) may be made closer to a measured water temperature WT2 to be detected by the water temperature sensor 13. Here, the correction value $Adn_{ij}$ is learned based on a deviation $\Delta$ WT2 between the measured water temperature WT2 detected by the water temperature sensor 13 in a case where the sensor was judged as being normal and the estimated water temperature WT2', and its initial value is '0° C.'. And this map may be turned into data form and be stored in the database 5.

The map shown in FIG. 7 tells that a water temperature which drops in an elapse of the predetermined time T after the stop of the engine is '$d8_{23}$', where a water temperature at the stop of the engine is 80° C. or above, an outside air temperature at that time is between 30° C. and 39° C. and an outside air temperature after an elapse of the predetermined time T from the stop of the engine is between 20° C. and 29° C., and that the correction value at that time is '$Ad8_{23}$'.

For example, in a case where the water temperature at the stop of the engine is 82° C., the outside air temperature at that time is 33° C., the outside air temperature after an elapse of the predetermined time T from the stop of the engine is 28° C., the drop water temperature $d8_{23}$ is set to be '20° C.' and the correction value $Ad8_{23}$ is set to be '2° C.', the water temperature after an elapse of the predetermined time T from the stop of the engine can be estimated as being 64° C. (=82° C.−20° C.+2° C.) from the map shown in FIG. 7.

Figure 8:
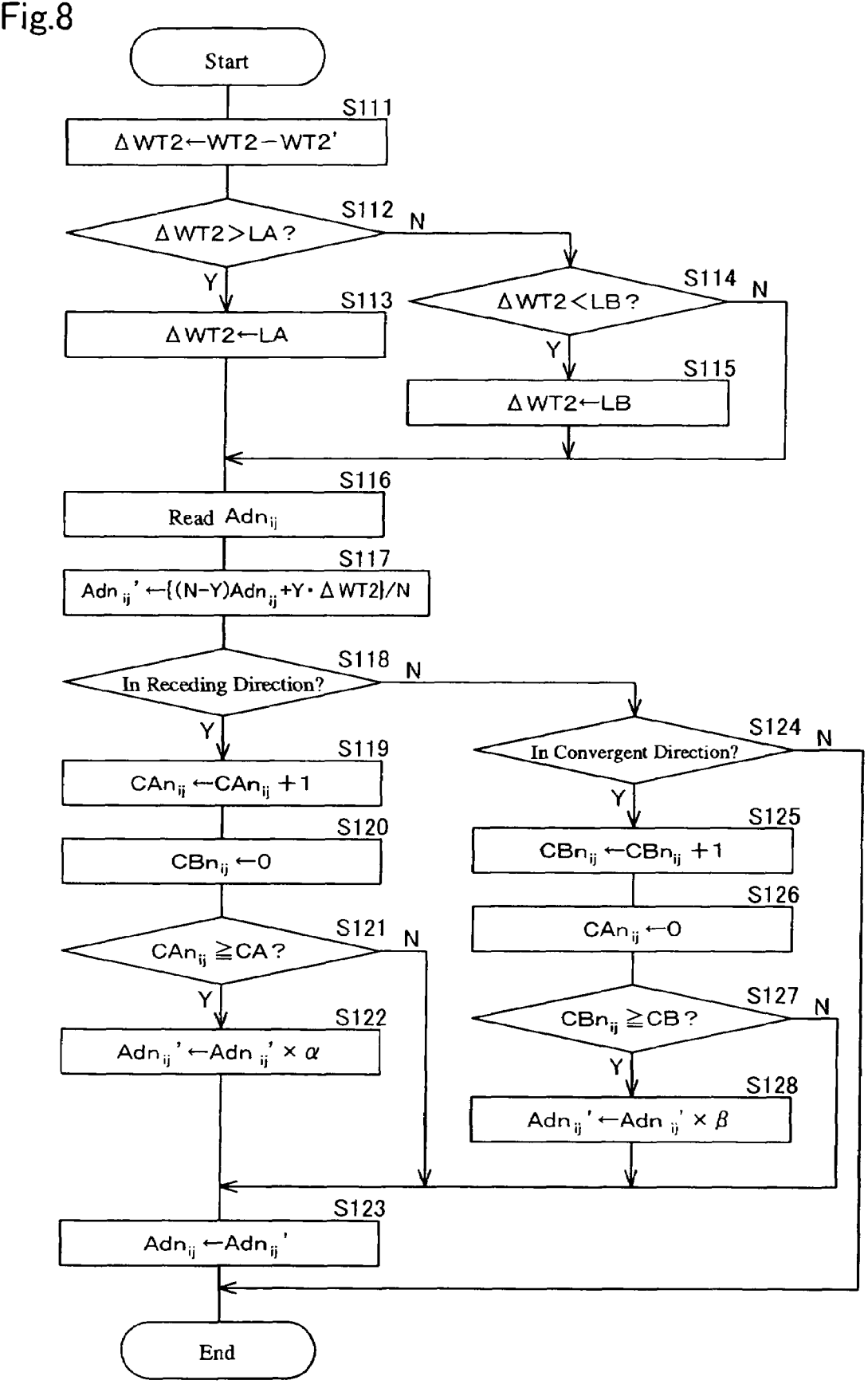
FIG. 8 is a flowchart showing a processing operation performed by a microcomputer in an engine control unit wherein a fault diagnostic apparatus according to another embodiment is adopted.

Learning of the correction value $Adn_{ij}$ is described below with a flowchart shown in FIG. 8. Here, this processing operation is conducted after the water temperature sensor 13 was judged as being in a normal condition in Step S16 of FIG. 4. First, the deviation $\Delta$ WT2 between the measured water temperature WT2 and the estimated water temperature WT2' is found (Step S111), and whether the deviation $\Delta$ WT2 is larger than an upper limit of LA (>0) or not is judged (Step S112). When it is judged that the deviation $\Delta$ WT2 is larger than the upper limit of LA, the deviation $\Delta$ WT2 is set to be the upper limit of LA (Step S113), and then, the operation goes to Step S116.

On the other hand, when it is judged that the deviation $\Delta$ WT2 is not larger than the upper limit of LA, whether the deviation $\Delta$ WT2 is smaller than a lower limit of LB (<0) or not is judged (Step S114). When it is judged that the deviation $\Delta$ WT2 is smaller than the lower limit of LB, the deviation $\Delta$ WT2 is set to be the lower limit of LB (Step S115), and then, the operation goes to Step S116. When it is judged that the deviation $\Delta$ WT2 is not smaller than the lower limit of LB, the operation directly goes to Step S116.

The correction value $Adn_{ij}$ (e.g. $Ad8_{11}$) is read from the map information (see FIG. 7) stored in the database 5 based on the water temperature WT1 at the stop of the engine, the outside air temperature OT1 at the stop of the engine and the outside air temperature OT2 after an elapse of the predetermined time T from the stop of the engine (Step S116). And then, leveling processing on the correction value $Adn_{ij}$ is performed by using the below-mentioned mathematical expression (Step S117).

$$Adn_{ij}' \leftarrow \{(N-Y)Adn_{ij}+Y\cdot\Delta WT2\}/N$$

By comparing this time correction value $Adn_{ij}'$ with the preceding correction value $Adn_{ij}$, whether the correction value $Adn_{ij}'$ has changed in a direction receding from 0 (receding direction) or not is judged (Step S118). When it is judged that the correction value $Adn_{ij}'$ has changed in the receding direction, '1' is added to a receding-side counter $CAn_{ij}$ (Step S119) and a convergent-side counter $CBn_{ij}$ is set at '0' (Step S120).

Whether the receding-side counter $CAn_{ij}$ indicates a prescribed number of times of CA or more is judged (Step S121). When it is judged that the receding-side counter $CAn_{ij}$ indicates the prescribed number of times of CA or more (i.e. the correction value $Adn_{ij}$ has receded from 0 in succession), the correction value $Adn_{ij}'$ is multiplied by a given value $\alpha$ (a numerical value larger than 1 such as 1.2) (Step S122). And then, the correction value $Adn_{ij}$ in the database 5 is updated to the correction value $Adn_{ij}'$ (Step S123).

On the other hand, when it is judged that the receding-side counter $CAn_{ij}$ does not indicate the prescribed number of times of CA or more, Step S122 is bypassed and the operation goes to Step S123, wherein the correction value $Adn_{ij}$ in the database 5 is updated to the correction value $Adn_{ij}'$.

When it is judged that the correction value $Adn_{ij}'$ has not changed in the receding direction in Step S118, by comparing the this time correction value $Adn_{ij}'$ with the preceding correction value $Adn_{ij}$, whether the correction value $Adn_{ij}'$ has changed in a direction approaching 0 (convergent direction) or not is judged (Step S124). When it is judged that the correction value $Adn_{ij}'$ has changed in the convergent direction, '1' is added to the convergent-side counter $CBn_{ij}$ (Step S125) and the receding-side counter $CAn_{ij}$ is set at '0' (Step S126).

Whether the convergent-side counter $CBn_{ij}$ indicates a prescribed number of times of CB or more is judged (Step S127). When it is judged that the convergent-side counter $CBn_{ij}$ indicates the prescribed number of times of CB or more (i.e. the correction value $Adn_{ij}$ has approached 0 in succession), the correction value $Adn_{ij}'$ is multiplied by a given value $\beta$ (a numerical value smaller than 1 such as 0.8) (Step S128). And then, the correction value $Adn_{ij}$ in the database 5 is updated to the correction value $Adn_{ij}'$ (Step S123).

On the other hand, when it is judged that the convergent-side counter $CBn_{ij}$ does not indicate the prescribed number of times of CB or more, Step S128 is bypassed and the operation goes to Step S123, wherein the correction value $Adn_{ij}$ in the database 5 is updated to the correction value $Ad_{nj}'$.

When it is judged that the correction value $Adn_{ij}'$ has not changed in the convergent direction (i.e. the correction value $Adn_{ij}'$ has changed neither in the receding direction nor in the convergent direction), this processing operation is concluded at once since it is not necessary to update the correction value $Adn_{ij}$ in the database 5.

Figure 9:
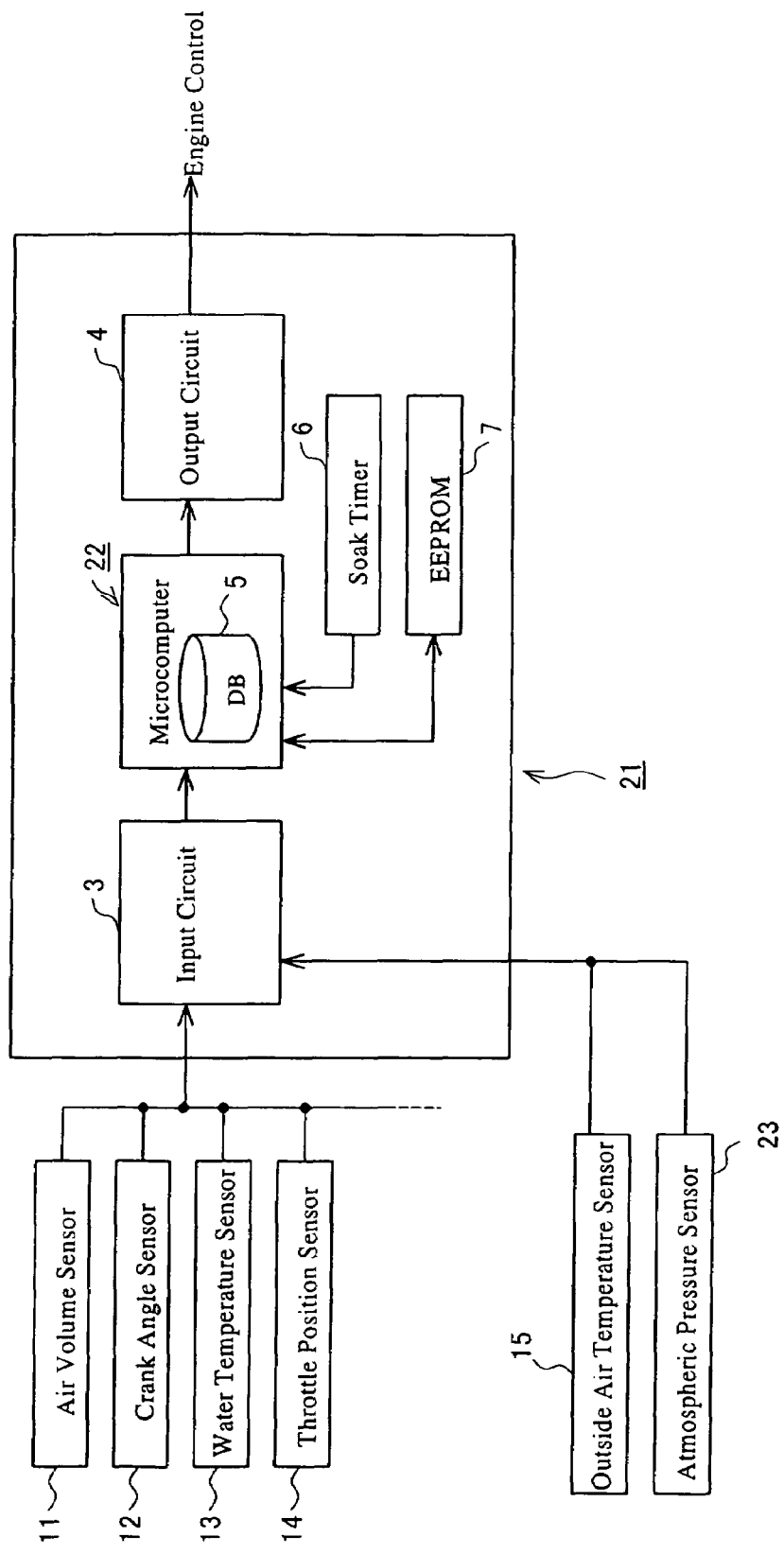
FIG. 9 is a block diagram schematically showing the principal part of an engine control unit wherein a fault diagnostic apparatus according to a second embodiment is adopted.

FIG. 9 is a block diagram schematically showing the principal part of an engine control unit wherein a fault diagnostic apparatus according to a second embodiment is adopted. Here, the same components as those of the engine control unit 1 shown in FIG. 1 are similarly marked.

Reference numeral 21 in FIG. 9 represents an engine control unit, comprising a microcomputer 22 having a CPU, a ROM and a RAM which are not shown and a database 5, an input circuit 3, an output circuit 4, a soak timer 6 for realizing a power supply to the engine control unit 21 at the end of an elapse of a predetermined time T after an IG switch is turned off (i.e. an electric power supply to the engine control unit 21 is shut off), and an EEPROM 7. Here, the database 5 may be arranged not within the microcomputer 22 but outside the microcomputer 22, though the rate of processing data becomes lower.

The microcomputer 22 captures information through the input circuit 3 from sensors of each kind (e.g. an air volume sensor 11, a crank angle sensor 12, a water temperature sensor 13 for detecting a temperature of cooling water for cooling an engine, and a throttle position sensor 14) and the like, performs computing processing of each kind, and conducts engine control and the like through the output circuit 4. In addition, an outside air temperature sensor 15 and an atmospheric pressure sensor 23 are connected through the input circuit 3 to the microcomputer 22, which can grasp an outside air temperature and an atmospheric pressure.

Figure 10:
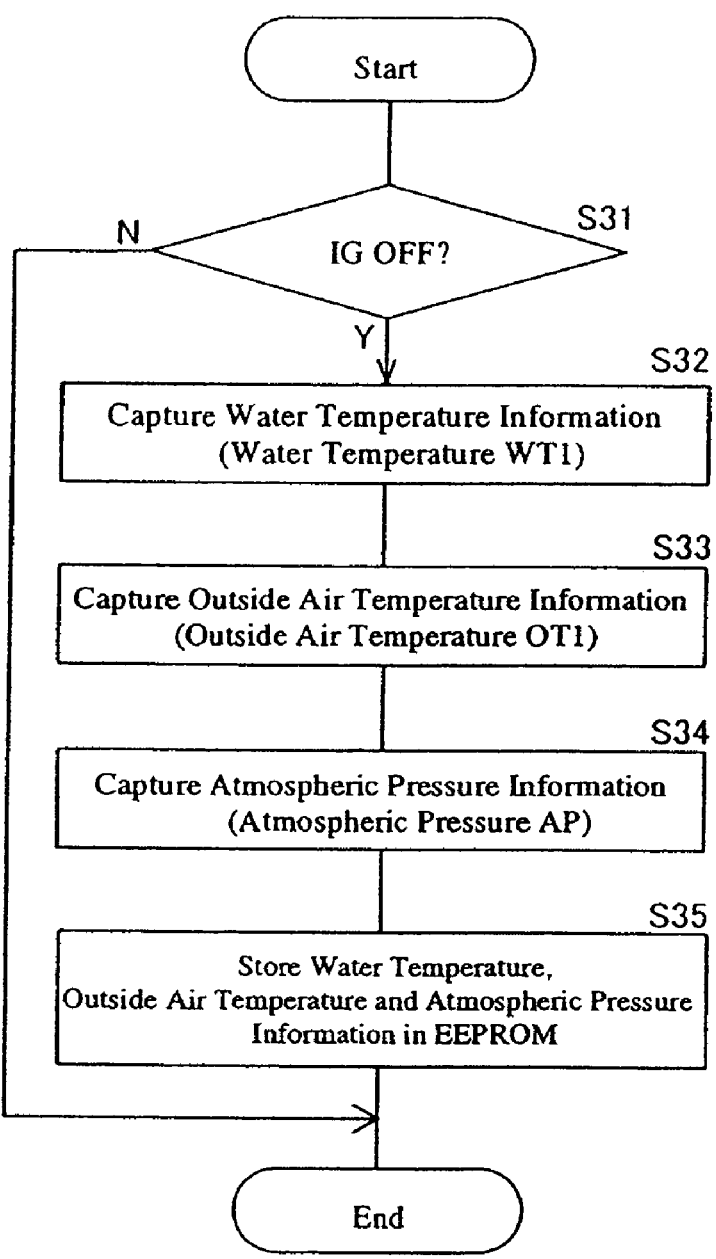
FIG. 10 is a flowchart showing a processing operation performed by a microcomputer in the engine control unit wherein the fault diagnostic apparatus according to the second embodiment is adopted.

A processing operation [2-1] performed by the microcomputer 22 in the engine control unit 21 wherein the fault diagnostic apparatus according to the second embodiment is adopted is described below with a flowchart shown in FIG. 10. Here, the processing operation [2-1] is conducted every prescribed time period. First, whether the IG switch was turned from the on position to the off position or not is judged (Step S31). When it is judged that the IG switch was turned from the on position to the off position (i.e. the engine came to a stop), information about a temperature of cooling water (water temperature WT1) obtained from the water temperature sensor 13 is captured (Step S32), and information about a temperature of outside air (outside air temperature OT) obtained from the outside air temperature sensor 15 is captured (Step S33).

Furthermore, information about an atmospheric pressure (atmospheric pressure AP) obtained from the atmospheric pressure sensor 23 is captured (Step S34). And the water temperature information, the outside air temperature information and the atmospheric pressure information are stored in the EEPROM 7 (Step S35).

Figure 11:
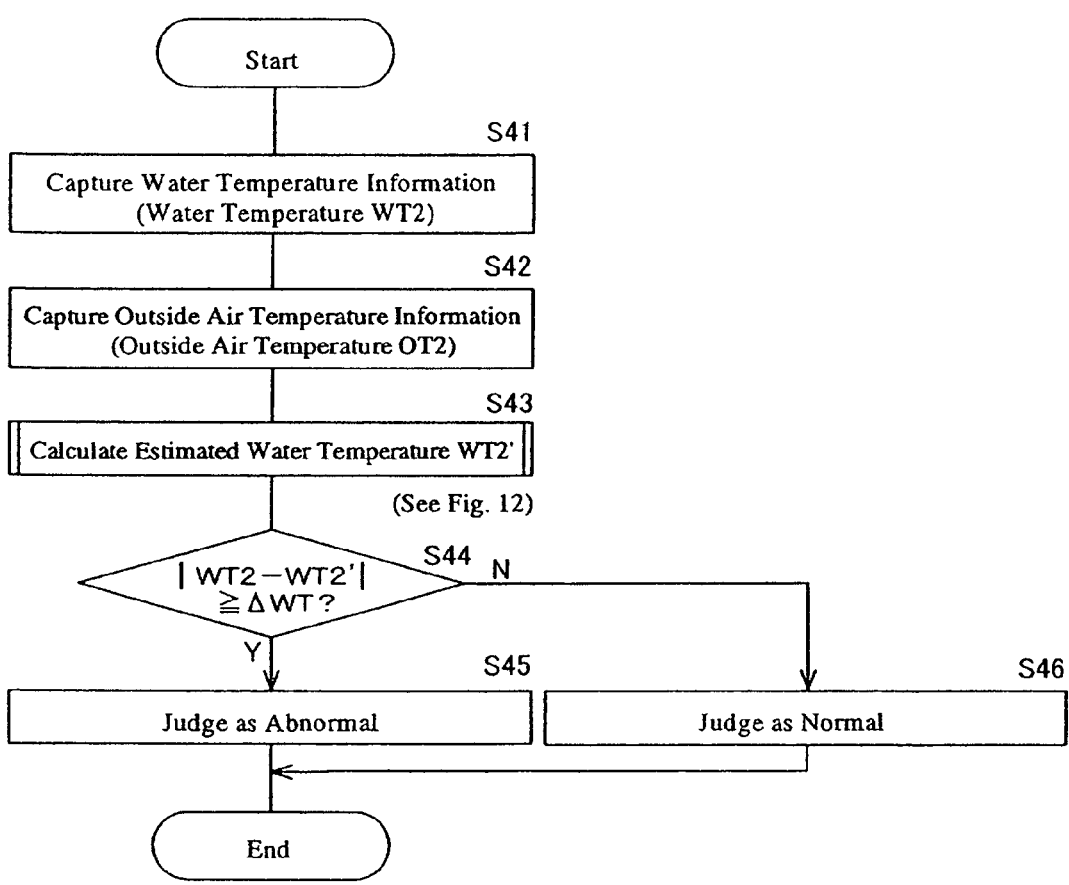
FIG. 11 is a flowchart showing a processing operation performed by the microcomputer in the engine control unit wherein the fault diagnostic apparatus according to the second embodiment is adopted.

A processing operation [2-2] performed by the microcomputer 22 in the engine control unit 21 wherein the fault diagnostic apparatus according to the second embodiment is adopted is described below with a flowchart shown in FIG. 11. Here, the processing operation [2-2] is conducted when electric power was provided by the soak timer 6 (i.e. when the predetermined time T elapsed after the stop of the engine). In other words, the processing operation [2-2] is conducted in cases where the engine has been at a stop for the predetermined time T.

Information about a temperature of cooling water (water temperature WT2) obtained from the water temperature sensor 13 is captured (Step S41), information about a temperature of outside air (outside air temperature OT2) obtained from the outside air temperature sensor 15 is captured (Step S42), and a water temperature WT2' of the cooling water after an elapse of the predetermined time T from the stop of the engine is estimated (Step S43). A method of estimating the water temperature WT2' is described in detail below with a flowchart shown in FIG. 12.

After estimating the water temperature WT2', whether or not a difference between the water temperature WT2 detected by the water temperature sensor 13 and the estimated water temperature WT2' is not less than a prescribed value Δ WT is judged (Step S44). When it is judged that the difference between the water temperature WT2 and the estimated water temperature WT2' is not less than the prescribed value Δ WT (i.e. the water temperature WT2 detected by the water temperature sensor 13 is far different from the estimated water temperature WT2'), it is decided that there is a fault in the water temperature sensor 13 (Step S45). On the other hand, when it is judged that the difference between the water temperature WT2 and the estimated water temperature WT2' is less than the prescribed value Δ WT, it is decided that the water temperature sensor 13 is in a normal condition (Step S46).

Figure 12:
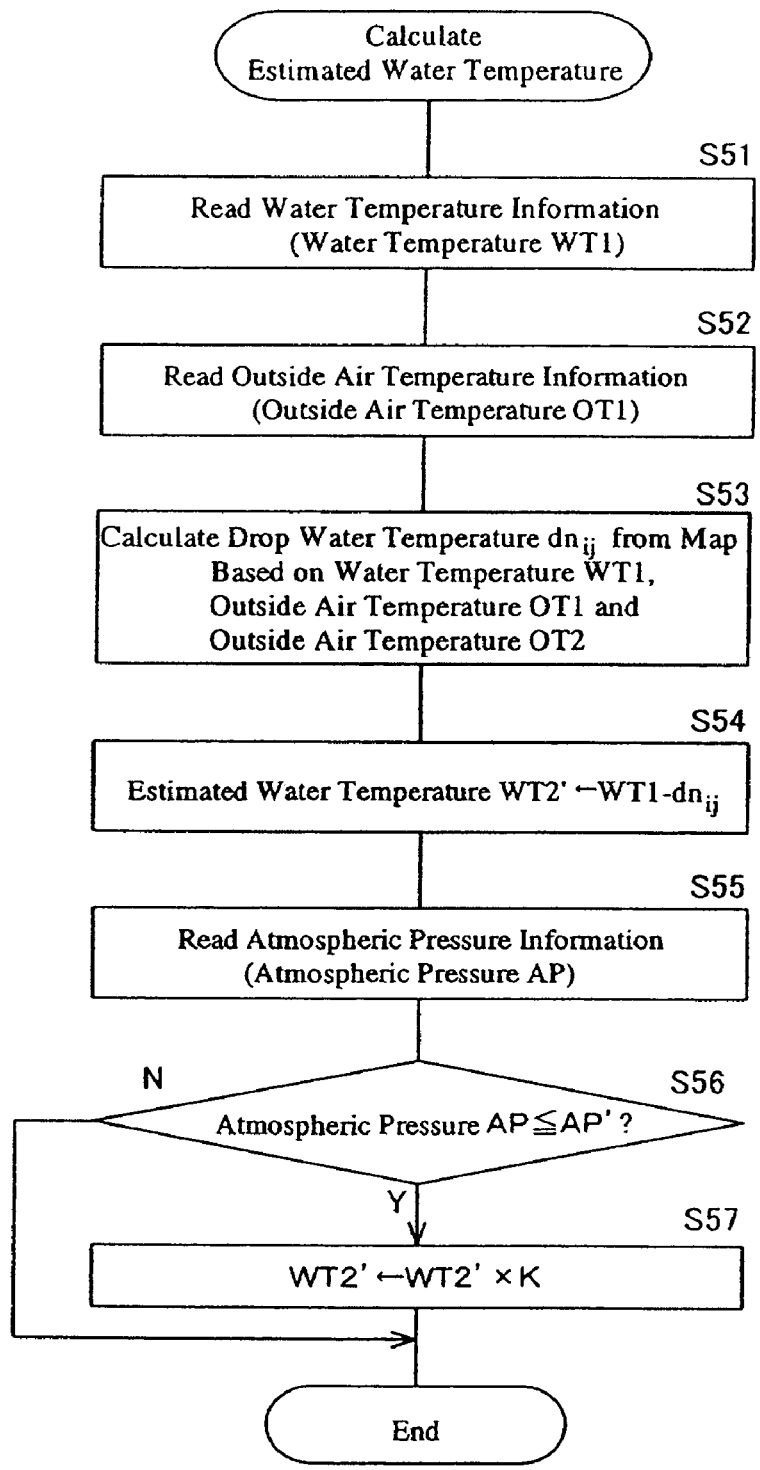
FIG. 12 is a flowchart showing a processing operation performed by the microcomputer in the engine control unit wherein the fault diagnostic apparatus according to the second embodiment is adopted.

A processing operation [2-3] performed by the microcomputer 22 in the engine control unit 21 wherein the fault diagnostic apparatus according to the second embodiment is adopted is described below with a flowchart shown in FIG. 12. Here, the processing operation [2-3] is conducted in Step S43 "Calculate Estimated Water Temperature WT2'" shown in FIG. 11.

Information showing the water temperature WT1 and the outside air temperature OT1 at the stop of the engine is read from the EEPROM 7 (Steps S51 and S52). And based on the water temperature WT1 at the stop of the engine, the outside air temperature OT 1 at the stop of the engine and the outside air temperature OT2 after an elapse of the predetermined time T from the stop of the engine, a water temperature $dn_{ij}$ (e.g. $d8_{11}$) that drops in an elapse of the predetermined time T after the stop of the engine is obtained from the map information (see FIG. 2) stored in the database 5 (Step S53). Thereafter, by subtracting the drop water temperature $dn_{ij}$ from the water temperature WT1, the estimated water temperature WT2' is calculated (Step S54).

Then, information showing the atmospheric pressure AP (an atmospheric pressure at a place where a user's vehicle is at a stop) is read from the EEPROM 7 (Step S55). Whether or not the atmospheric pressure AP is not more than a prescribed atmospheric pressure AP' is judged (Step S56). When it is judged that the atmospheric pressure AP is not more than the prescribed atmospheric pressure AP' (i.e. the atmospheric pressure is low and the rate of temperature drop becomes higher than usual), the estimated water temperature WT2' is determined by multiplying the estimated water temperature WT2' by a factor K (>1) (Step S57). On the other hand, when it is judged that the atmospheric pressure AP is more than the prescribed atmospheric pressure AP', the processing operation [2-3] is concluded at once.

Figure 13:
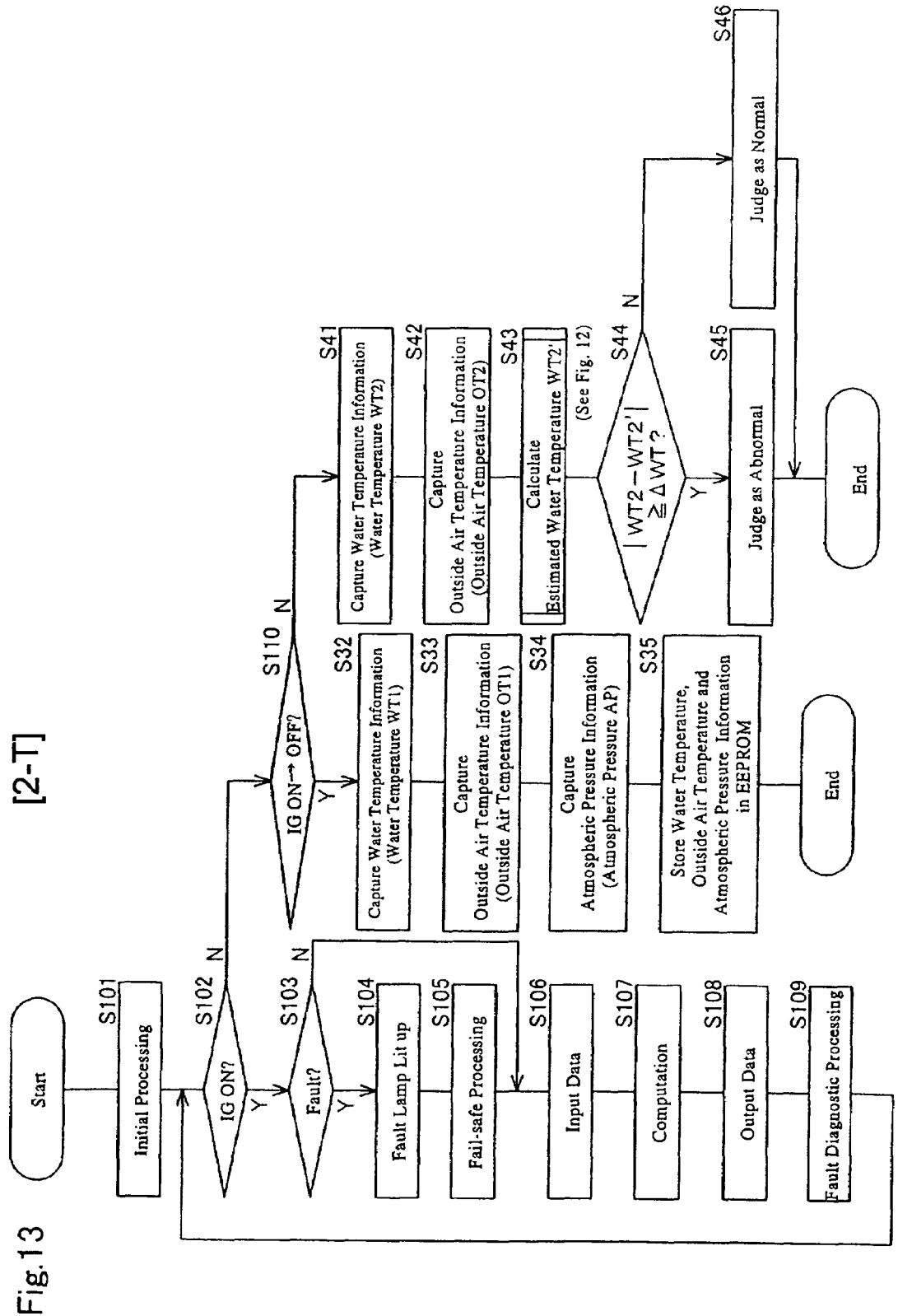
FIG. 13 is a flowchart showing a processing operation performed by the microcomputer in the engine control unit wherein the fault diagnostic apparatus according to the second embodiment is adopted.

The processing operations [2-1] to [2-3] which are characteristics of the apparatus according to the present invention, performed by the microcomputer 22 in the engine control unit 21 wherein the fault diagnostic apparatus according to the second embodiment is adopted were separately described above. An overall processing operation [2-T] performed by the microcomputer 22 is as shown in FIG. 13.

By using the fault diagnostic apparatus according to the second embodiment, since the temperature of the cooling water is estimated in consideration of the atmospheric pressure AP as a parameter related to a drop in temperature of the cooling water, the estimate accuracy can be improved. Here, in cases where the atmospheric pressure AP is not more than the prescribed atmospheric pressure AP', the estimated water temperature is corrected simply by multiplying the estimated water temperature WT2' by the factor K. But the method of correction is not limited to this method. In another embodiment, the factor K may be set according to how high the atmospheric pressure AP is.

For example, when the atmospheric pressure AP is not less than an atmospheric pressure AP1, the factor K is set to be less than 1. When the atmospheric pressure AP is not less than an atmospheric pressure AP2 (AP2<AP1) and less than the atmospheric pressure AP1, the factor K is set to be 1. And when the atmospheric pressure AP is less than the atmospheric pressure AP2, the factor K is set to be more than 1.

Figure 14:
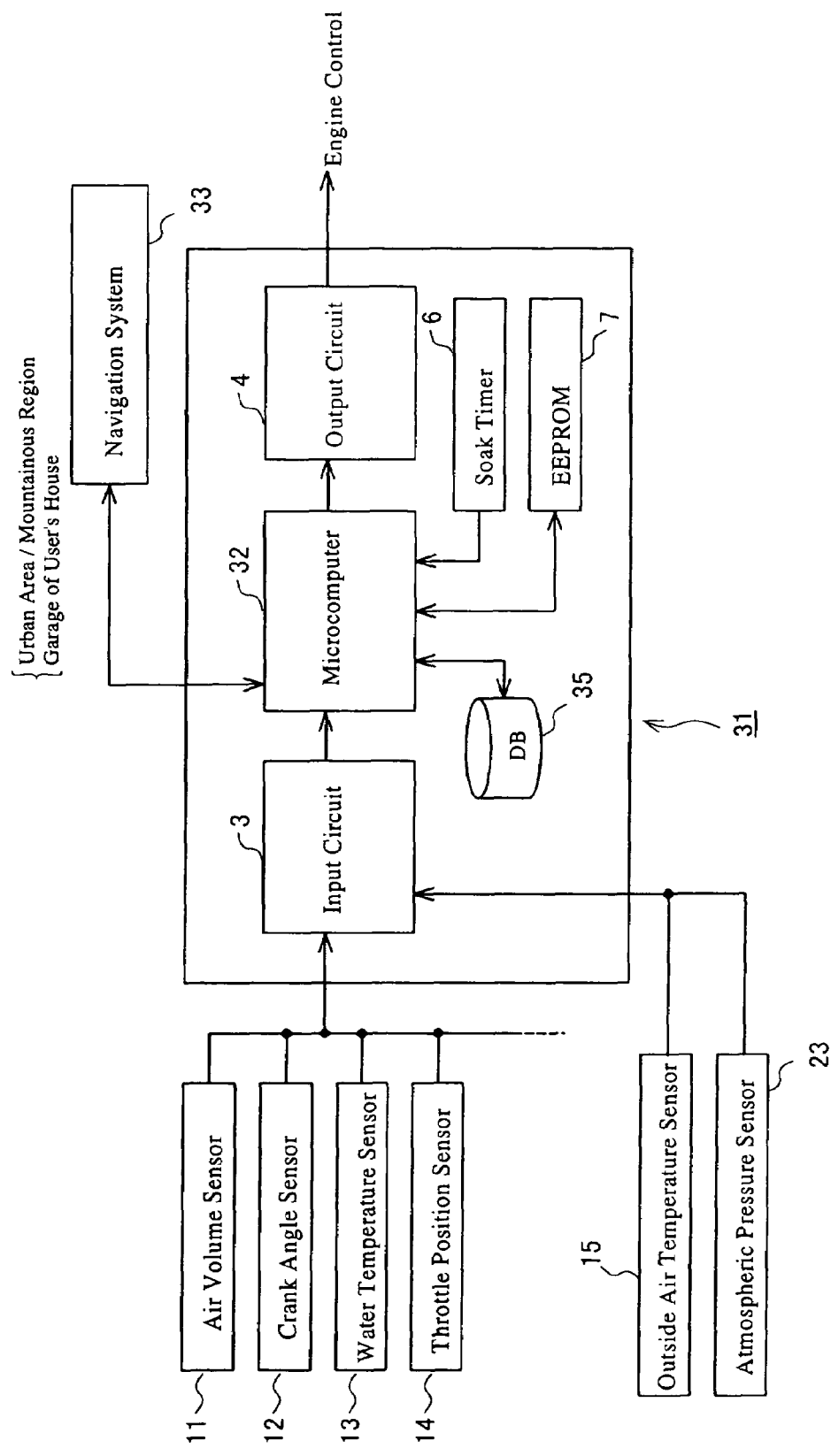
FIG. 14 is a block diagram schematically showing the principal part of an engine control unit wherein a fault diagnostic apparatus according to a third embodiment is adopted.

FIG. 14 is a block diagram schematically showing the principal part of an engine control unit wherein a fault diagnostic apparatus according to a third embodiment is adopted. Here, the same components as those of the engine control unit 1 shown in FIG. 1 are similarly marked.

Reference numeral 31 in FIG. 14 represents an engine control unit, comprising a microcomputer 32 having a CPU, a ROM and a RAM, an input circuit 3, an output circuit 4, a database 35, a soak timer 6 for realizing a power supply to the engine control unit 31 at the end of an elapse of a predetermined time T after an IG switch is turned off (i.e. an electric power supply to the engine control unit 31 is shut off), and an EEPROM 7.

The microcomputer 32 captures information through the input circuit 3 from sensors of each kind (e.g. an air volume sensor 11, a crank angle sensor 12, a water temperature sensor 13 for detecting a temperature of cooling water for cooling an engine, and a throttle position sensor 14) and the like, performs computing processing of each kind, and can conduct engine control and the like through the output circuit 4. In addition, an outside air temperature sensor 15 and an atmospheric pressure sensor 23 are connected through the input circuit 3 to the microcomputer 32, which can grasp an outside air temperature and an atmospheric pressure.

Moreover, a navigation system 33 is connected to the microcomputer 32, which can receive information showing that a current position of a user's vehicle is in an urban area, or in a mountainous region, or in a garage of the user's house sent from the navigation system 33 as navigation information.

FIG. 15 is a map showing relationships among a water temperature at a stop of the engine in a specified place (here, a garage of a user's house), an outside air temperature at the stop of the engine, an outside air temperature after an elapse of a predetermined time T from the stop of the engine and a water temperature that drops in an elapse of the predetermined time T after the stop of the engine. This is turned into data form and the data is stored in the database 35. In the database 35, not only the data made of the map (special map) shown in FIG. 15 but also the data made of the map (general map) shown in FIG. 2 are stored. Here, the database 35 may be arranged within the microcomputer 32 (such as the CPU). As a result, the rate of processing becomes higher, resulting in power savings.

Figure 16:
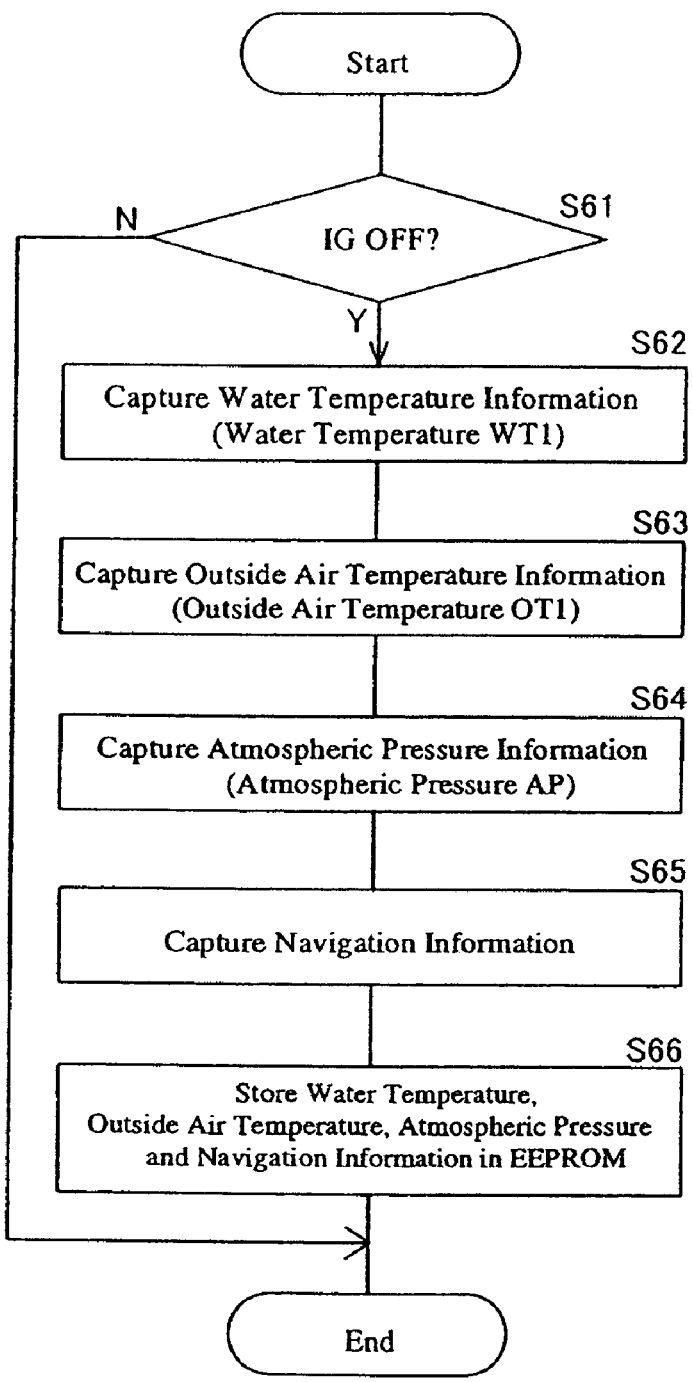
FIG. 16 is a flowchart showing a processing operation performed by a microcomputer in the engine control unit wherein the fault diagnostic apparatus according to the third embodiment is adopted.

A processing operation [3-1] performed by the microcomputer 32 in the engine control unit 31 wherein the fault diagnostic apparatus according to the third embodiment is adopted is described below with a flowchart shown in FIG. 16. Here, the processing operation [3-1] is conducted every prescribed time period. First, whether the IG switch was turned from the on position to the off position or not is judged (Step S61). When it is judged that the IG switch was turned from the on position to the off position (i.e. the engine came to a stop), information about a temperature of cooling water (water temperature WT1) obtained from the water temperature sensor 13 is captured (Step S62), and information about a temperature of outside air (outside air temperature OT1) obtained from the outside air temperature sensor 15 is captured (Step S63).

Furthermore, information about an atmospheric pressure (atmospheric pressure AP) obtained from the atmospheric pressure sensor 23 is captured (Step S64). Then, the microcomputer 32 requests that the navigation system 33 sends navigation information and captures the navigation information sent from the navigation system 33 (Step S65). The water temperature information, the outside air temperature information, the atmospheric pressure information and the navigation information are stored in the EEPROM 7 (Step S66).

Figure 17:
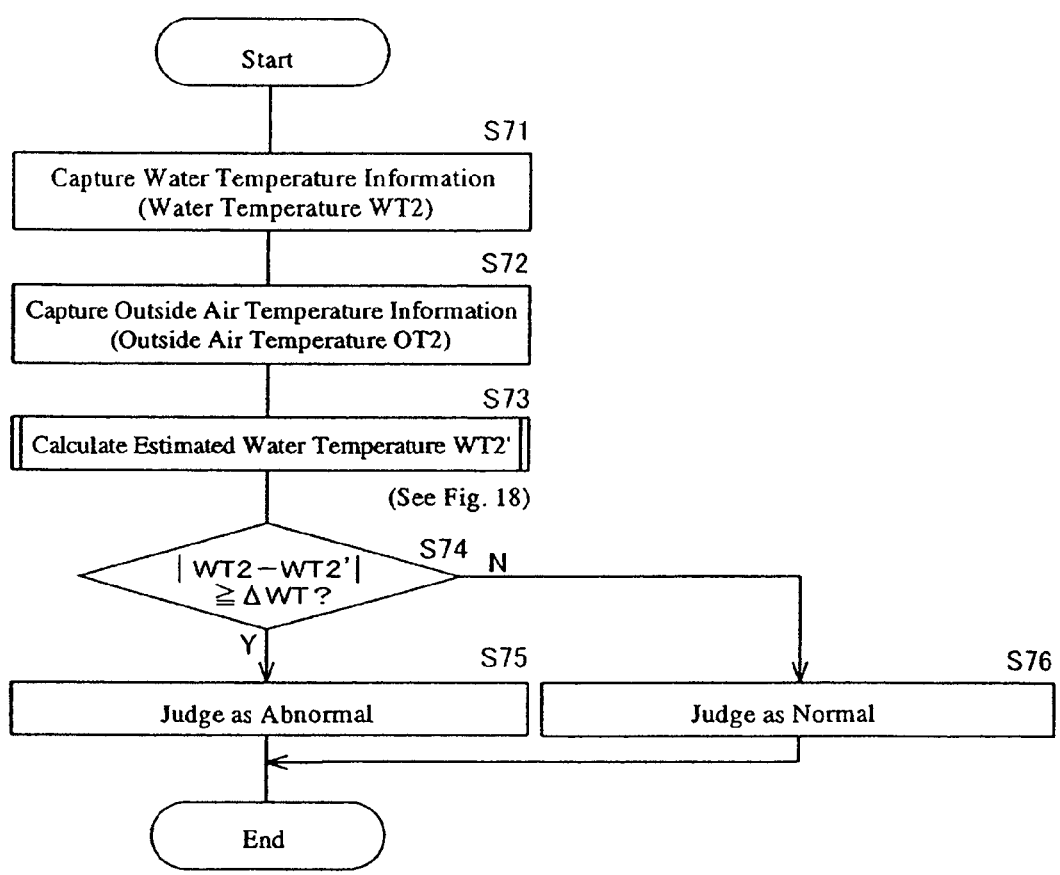
FIG. 17 is a flowchart showing a processing operation performed by the microcomputer in the engine control unit wherein the fault diagnostic apparatus according to the third embodiment is adopted.

A processing operation [3-2] performed by the microcomputer 32 in the engine control unit 31 wherein the fault diagnostic apparatus according to the third embodiment is adopted is described below with a flowchart shown in FIG. 17. Here, the processing operation [3-2] is conducted when electric power was provided by the soak timer 6 (i.e. when the predetermined time T elapsed after the stop of the engine). In other words, the processing operation [3-2] is conducted in cases where the engine has been at a stop for the prescribed time T.

Information about a temperature of cooling water (water temperature WT2) obtained from the water temperature sensor 13 is captured (Step S71), information about a temperature of outside air (outside air temperature OT2) obtained from the outside air temperature sensor 15 is captured (Step S72), and a water temperature WT2' of the cooling water after an elapse of the predetermined time T from the stop of the engine is estimated (Step S73). A method of estimating the water temperature WT2' is described in detail below with a flowchart shown in FIG. 18.

After estimating the water temperature WT2', whether or not a difference between the water temperature WT2 detected by the water temperature sensor 13 and the estimated water temperature WT2' is not less than a prescribed value $\Delta$ WT is judged (Step S74). When it is judged that the difference between the water temperature WT2 and the estimated water temperature WT2' is not less than the prescribed value $\Delta$ WT (i.e. the water temperature WT2 detected by the water temperature sensor 13 is far different from the estimated water temperature WT2'), it is decided that there is a fault in the water temperature sensor 13 (Step S75). On the other hand, when it is judged that the difference between the water temperature WT2 and the estimated water temperature WT2' is less than the prescribed value $\Delta$ WT, it is decided that the water temperature sensor 13 is in a normal condition (Step S76).

Figure 18:
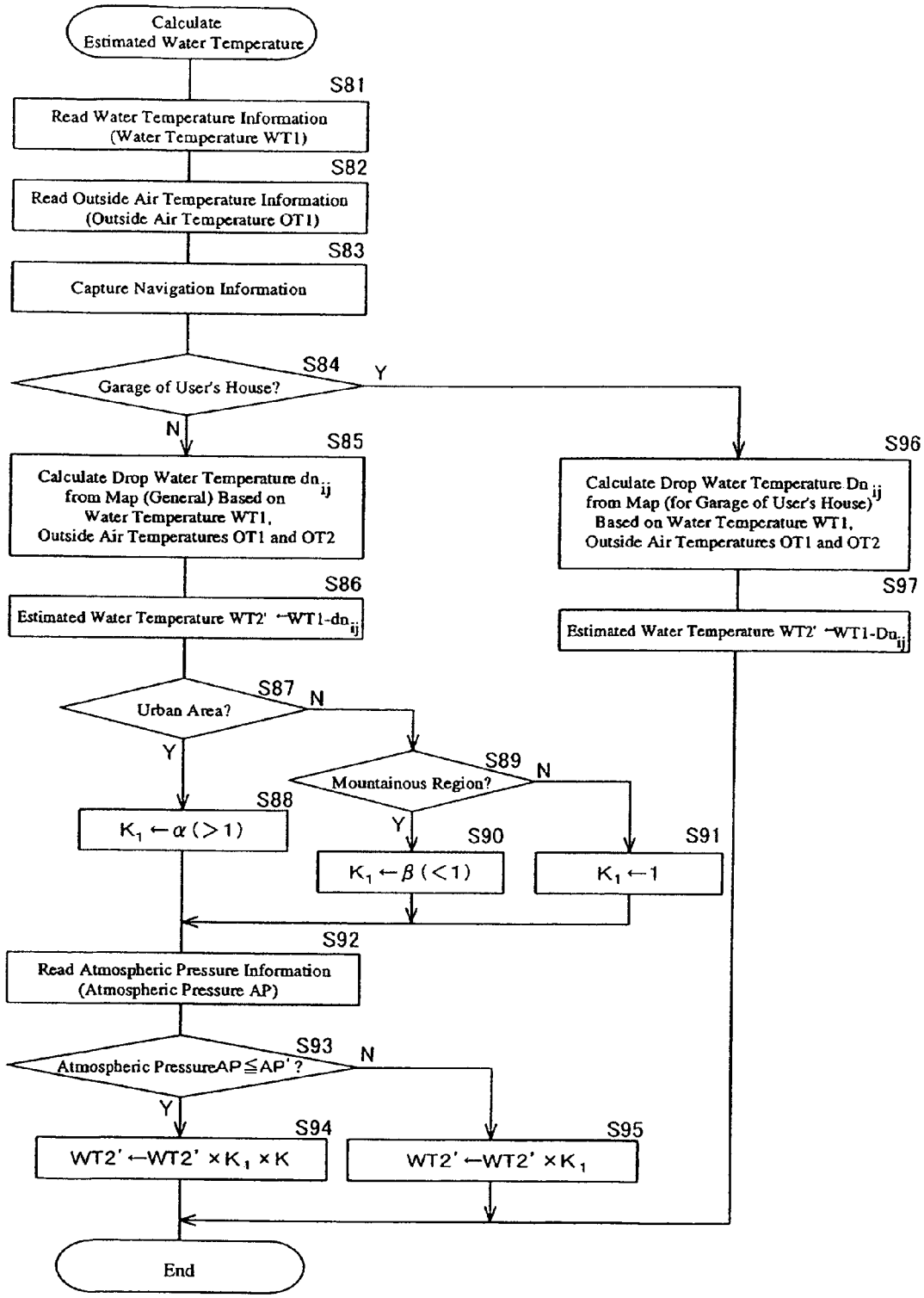
FIG. 18 is a flowchart showing a processing operation performed by the microcomputer in the engine control unit wherein the fault diagnostic apparatus according to the third embodiment is adopted.

A processing operation [3-3] performed by the microcomputer 32 in the engine control unit 31 wherein the fault diagnostic apparatus according to the third embodiment is adopted is described below with a flowchart shown in FIG. 18. Here, the processing operation [3-3] is conducted in Step S73 "Calculate Estimated Water Temperature WT2'" shown in FIG. 17.

Information showing the water temperature WT1 and the outside air temperature OT1 at the stop of the engine and navigation information are read from the EEPROM 7 (Steps S81-S83). And based on the read-out navigation information, whether the user's vehicle is in a specified place (here, a garage of the user's house) or not is judged (Step S84).

When it is judged that the user's vehicle is not in the garage of the user's house, based on the water temperature WT1 at the stop of the engine, the outside air temperature OT1 at the stop of the engine and the outside air temperature OT2 after an elapse of the predetermined time T from the stop of the engine, a water temperature $dn_{ij}$ (e.g. $d8_{11}$) that drops in an elapse of the predetermined time T after the stop of the engine is obtained from the general map information (see FIG. 2) stored in the database 35 (Step S85). Thereafter, by subtracting the drop water temperature $dn_{ij}$ from the water temperature WT1, the estimated water temperature WT2' is calculated (Step S86).

Based on the navigation information, whether the user's vehicle is in an urban area or not is judged (Step S87). When it is judged that the user's vehicle is in an urban area (i.e. the user's vehicle is in a place where the temperature does not easily decrease), a factor $K_1$ used for correcting the estimated water temperature WT2' is set to be a (>1) (Step S88) and the operation goes to Step S92.

On the other hand, when it is judged that the user's vehicle is not in an urban area, whether the user's vehicle is in a mountainous region or not is judged based on the navigation information (Step S89). When it is judged that the user's vehicle is in a mountainous region (i.e. the user's vehicle is in a place where the temperature easily decreases), the factor K, used for correcting the estimated water temperature WT2' is set to be β (<1) (Step S90) and the operation goes to Step S92. On the other hand, when it is judged that the user's vehicle is not in a mountainous region, the factor $K_1$ is set to be 1 (Step S91) and the operation goes to Step S92.

Then, information showing the atmospheric pressure AP (an atmospheric pressure at a place where the user's vehicle is at a stop) is read from the EEPROM 7 (Step S92). Whether or not the atmospheric pressure AP is not more than a prescribed atmospheric pressure AP' is judged (Step S93). When it is judged that the atmospheric pressure AP is not more than the prescribed atmospheric pressure AP' (i.e. the atmospheric pressure is low and the rate of temperature drop becomes higher than usual), the estimated water temperature WT2' is determined by multiplying the estimated water temperature WT2' by the factor $K_1$ and a factor K (>1) (Step S94). On the other hand, when it is judged that the atmospheric pressure AP is more than the prescribed atmospheric pressure AP', the estimated water temperature WT2' is determined by multiplying the estimated water temperature WT2' by the factor $K_1$ (Step S95).

When it is judged that the user's vehicle is in the garage of the user's house in Step S84, based on the water temperature WT1 at the stop of the engine, the outside air temperature OT1 at the stop of the engine and the outside air temperature OT2 after an elapse of the predetermined time T from the stop of the engine, a water temperature $Dn_{ij}$ (e.g. $d8_{11}$) that drops in an elapse of the predetermined time T after the stop of the engine is obtained from the special map information (see FIG. 15) stored in the database 35 (Step S96). Thereafter, by subtracting the drop water temperature $Dn_{ij}$ from the water temperature WT1, the estimated water temperature WT2' is calculated (Step S97).

Here, the estimated water temperature WT2' is calculated by using the map information specified for the case where the user's vehicle is in the garage of the user's house, but the specified place is not limited to the garage of the user's house. A parking lot of the user's office or a parking pool of a supermarket that the user frequently visits may be adoptable. In another embodiment, map information about these parking places may be previously prepared and when the user's vehicle is in any one of these parking places, the estimated water temperature WT2' may be calculated by using the map information corresponding to each place.

Figure 19:
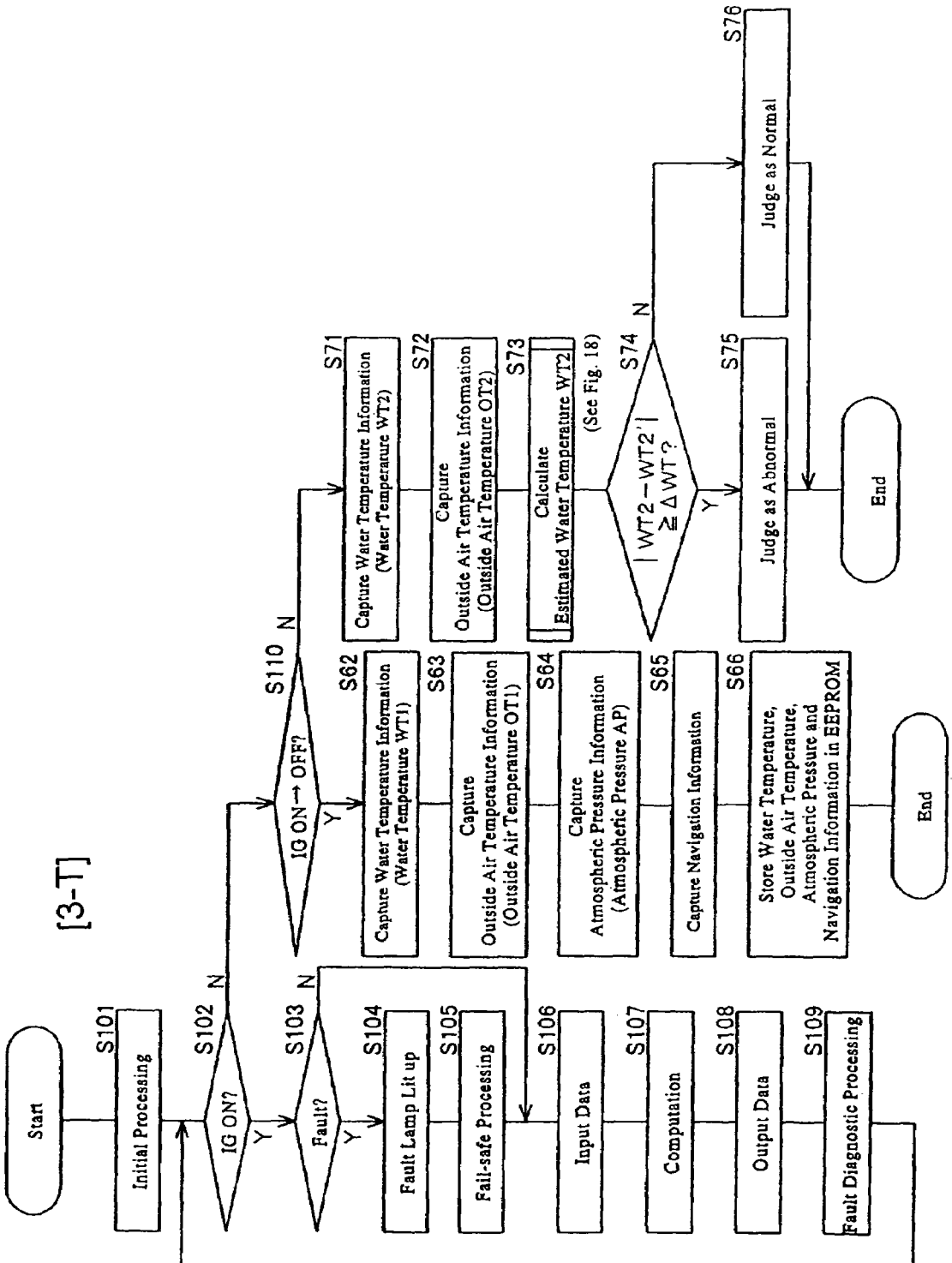
FIG. 19 is a flowchart showing a processing operation performed by the microcomputer in the engine control unit wherein the fault diagnostic apparatus according to the third embodiment is adopted.

The processing operations [3-1] to [3-3] which are characteristics of the apparatus according to the present invention, performed by the microcomputer 32 in the engine control unit 31 wherein the fault diagnostic apparatus according to the third embodiment is adopted were separately described above. An overall processing operation [3-T] performed by the microcomputer 32 is as shown in FIG. 19.

In the fault diagnostic apparatus according to the third embodiment, the water temperature of the cooling water is estimated in consideration of the atmospheric pressure AP and where the user's vehicle is placed (here, an urban area/a mountainous region) as parameters related to a drop in temperature of the cooling water, leading to improvement of the estimate accuracy.

In addition, when the user's vehicle is in a specified place (the garage of the user's house), the water temperature of the cooling water is estimated based on a temperature drop characteristic of the cooling water in that place. As a result, the estimate accuracy of temperature of the cooling water can be further improved when the user's vehicle is in the specified place. Here, the special map shown in FIG. 15 can be captured by accumulating data and learning.

In the first to third embodiments, the cases where the fault diagnostic apparatus is adopted in the engine control unit were described. But, the fault diagnostic apparatus and the engine control unit may be separately arranged. In another embodiment, a fault diagnostic apparatus may be able to receive necessary information from an engine control unit and the result of a diagnosis may be sent from the fault diagnostic apparatus to the engine control unit.

As for the fault diagnostic apparatuses according to the first to third embodiments, the cases where a fault of the water temperature sensor 13 for detecting a temperature of cooling water is diagnosed were described. But, a sensor to be a subject of the diagnosis is not limited to the water temperature sensor 13. In another embodiment, a sensor for detecting a temperature of engine oil or the like may be a subject of a diagnosis.

Moreover, the fault diagnostic apparatus according to the present invention is effective not only in checking a sensor for detecting a temperature of cooling water for cooling an engine or a sensor for detecting a temperature of engine oil, but also in a fault diagnosis performed in a situation where a parameter to be a chief source of heating an object to be examined decreases.

For example, it is effective in checking a temperature sensor for measuring a water temperature of a bath having an automatic reheat function (i.e. a function of keeping water temperature of a bath at a fixed temperature or above). The automatic reheat function is to reheat the bath water when the water temperature of the bath decreased to a fixed temperature or below. Therefore, if the temperature sensor for measuring the water temperature has a fault, the function does not work.

When a temperature detected by the temperature sensor has not decreased after a given time elapsed, regardless of after water in the bath was heated and the heat function stopped, that is, being in a situation where the water temperature falls, the temperature sensor can be judged as being abnormal.

And it is effective in checking a temperature sensor mounted on a small kitchen range (e.g. a gas range) having a function of preventing heating of an empty pot or a temperature control function of oil for deep-frying. When a temperature detected by the temperature sensor has not decreased after a given time elapsed, regardless of after the kitchen range was switched off, that is, being in a situation where the temperature falls, the temperature sensor can be judged as being abnormal.

What is claimed is:

1. A fault diagnostic apparatus for diagnosing a fault of a temperature detector that detects a temperature of an object to be examined,
wherein the object is mounted on a vehicle, said fault diagnostic apparatus comprising:
a fault diagnostic device for diagnosing the fault of the temperature detector based on a change in temperature detected by the temperature detector when a temperature of an internal combustion engine, which is a primary source of heating of the object, decreases, wherein when an ignition (IG) switch is in an off position the temperature of the internal combustion engine is judged as decreasing, and said fault diagnostic device diagnoses the fault of the temperature detector while the IG switch is in the off position.

2. A fault diagnostic apparatus according to claim 1, wherein said fault diagnostic device further comprises:

a temperature estimating unit for estimating a temperature of the object based on parameters related to at least one of a quantity of radiant heat of the object and a heating value of the object; and a temperature comparing unit for comparing an estimated temperature estimated by the temperature estimating unit with a temperature detected by the temperature detector, and wherein said fault diagnostic device diagnoses the fault of the temperature detector based on a comparison result of said temperature comparing unit.

3. A fault diagnostic apparatus according to claim 2, wherein said temperature comparing unit compares the estimated temperature at the end of a predetermined time period after the IG switch is turned off with a measured temperature detected by the temperature detector.

4. A fault diagnostic apparatus according to claim 2, wherein said temperature estimating unit estimates the temperature of the object after an elapse of a predetermined time period from a prescribed time, based on a map showing relationships among:

a temperature of the object at the prescribed time;

a parameter at the prescribed time;

a parameter after an elapse of the predetermined time period from the prescribed time; and the temperature of the object that drops in the predetermined time period after the prescribed time.

5. A fault diagnostic apparatus according to claim 2, wherein said temperature estimating unit estimates the temperature of the object after an elapse of a predetermined time period, based on the temperature of the object detected by the temperature detector at a prescribed time; and a parameter at the prescribed time or a parameter after an elapse of the predetermined time period from the prescribed time, or a parameter at the prescribed time and a parameter after an elapse of the predetermined time period from the prescribed time.

6. A fault diagnostic apparatus according to claim 2, further comprising:

a correcting unit for correcting the estimated temperature in a manner that makes the estimated temperature closer to a measured temperature to be detected by the temperature detector; and a learning unit that learns a correction value from said correcting unit based on a deviation between the estimated temperature of the object and a measured temperature detected by the temperature detector in a case where the temperature detector was judged as being normal.

7. A fault diagnostic apparatus according to claim 2, wherein the parameter is at least one of an outside air temperature and an internal combustion engine oil temperature.

8. A fault diagnostic apparatus according to claim 2, wherein the estimated temperature is corrected based on a parameter related to a temperature drop of the object.

9. A fault diagnostic apparatus according to claim 8, wherein the parameter is at least one of an atmospheric pressure and location information of the vehicle.

10. A fault diagnostic apparatus according to claim 1, wherein said fault diagnostic device further comprises:

a temperature estimating unit for estimating a temperature of the object based on location information of the vehicle and a temperature drop characteristic of the object in a specified place; and a temperature comparing unit for comparing an estimated temperature estimated by said temperature estimating unit with a temperature detected by the temperature detector, and wherein said fault diagnostic device diagnoses the fault of the temperature detector based on a comparison result of said temperature comparing unit.

11. A fault diagnostic apparatus according to claim 10, wherein the specified place is a parking lot where the vehicle is frequently parked.

* * * * *